(12) United States Patent
Hosseini et al.

(10) Patent No.: US 10,306,627 B2
(45) Date of Patent: May 28, 2019

(54) TECHNIQUES FOR ALLOCATING RESOURCES IN LOW LATENCY WIRELESS COMMUNICATIONS

(71) Applicant: QUALCOMM Incorporated, San Diego, CA (US)

(72) Inventors: Seyedkianoush Hosseini, San Deigo, CA (US); Wanshi Chen, San Diego, CA (US); Peter Gaal, San Diego, CA (US); Jing Sun, San Diego, CA (US); Shimman Arvind Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 76 days.

(21) Appl. No.: 15/612,698

(22) Filed: Jun. 2, 2017

(65) Prior Publication Data

US 2018/0084545 A1 Mar. 22, 2018

Related U.S. Application Data

(60) Provisional application No. 62/396,070, filed on Sep. 16, 2016.

(51) Int. Cl.
*H04W 72/04* (2009.01)
*H04W 72/14* (2009.01)
(Continued)

(52) U.S. Cl.
CPC ....... *H04W 72/0446* (2013.01); *H04L 1/0038* (2013.01); *H04L 5/001* (2013.01);
(Continued)

(58) Field of Classification Search
CPC ..... H04L 1/0038; H04L 5/001; H04L 5/0042; H04L 5/0053; H04L 5/0007; H04L 5/0037; H04L 5/0076; H04L 5/0094; H04W 72/0446; H04W 72/1284; H04W 72/1289; H04W 72/14; H04W 88/08;
(Continued)

(56) References Cited

U.S. PATENT DOCUMENTS

2016/0182202 A1  6/2016 Patel et al.
2016/0270059 A1  9/2016 Chen et al.
(Continued)

OTHER PUBLICATIONS

International Search Report and Written Opinion—PCT/US2017/043771—ISA/EPO—dated Oct. 9, 2017. 15 pages.
(Continued)

*Primary Examiner* — Awet Haile
(74) *Attorney, Agent, or Firm* — Anthony R. Morris

(57) ABSTRACT

Various aspects described herein relate to receiving wireless communications from an access point, determining resources of the wireless communications associated with a search space for control information in the received wireless communications, and performing one or more of a set of blind decodes over the search space to decode at least low latency control information associated with a low latency communication technology, wherein the low latency communication technology utilizes a transmission time interval (TTI) having a duration that is less than a subframe of a legacy communication technology.

79 Claims, 9 Drawing Sheets

(51) Int. Cl.
*H04W 72/12* (2009.01)
*H04L 1/00* (2006.01)
*H04L 5/00* (2006.01)
*H04W 88/08* (2009.01)

(52) U.S. Cl.
CPC ....... *H04L 5/0053* (2013.01); *H04W 72/1284* (2013.01); *H04W 72/14* (2013.01); *H04L 5/0042* (2013.01); *H04W 72/1289* (2013.01); *H04W 88/08* (2013.01)

(58) Field of Classification Search
CPC ........... H04W 72/044; H04W 72/0406; H04W 72/085; H04W 72/1242
See application file for complete search history.

(56) References Cited

U.S. PATENT DOCUMENTS

| | | | |
|---|---|---|---|
| 2017/0135084 A1* | 5/2017 | Kuchibhotla | H04L 5/0007 |
| 2018/0063749 A1* | 3/2018 | Islam | H04B 7/2656 |
| 2018/0098337 A1* | 4/2018 | Lee | H04W 72/042 |

OTHER PUBLICATIONS

QUALCOMM Incorporated: "Downlink Design for Shortened TTI", 3GPP TSG RAN WG1 #86, R1-166309, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 13, 2016, XP051132725, Retrieved from the Internet: URL:http://www.3gpp.org/ftp/tsg_ran/WG1_RL1/TSGR1_86/Docs/, 14 pages.

* cited by examiner

TECHNIQUES FOR ALLOCATING RESOURCES IN LOW LATENCY WIRELESS COMMUNICATIONS

CLAIM OF PRIORITY UNDER 35 U.S.C. § 119

The present Application for Patent claims priority to Provisional Application No. 62/396,070, entitled "TECHNIQUES FOR ALLOCATING RESOURCES IN LOW LATENCY WIRELESS COMMUNICATIONS" filed Sep. 16, 2016, which is assigned to the assignee hereof and hereby expressly incorporated by reference herein for all purposes.

BACKGROUND

Described herein are aspects generally related to communication systems, and more particularly, to allocating resources is wireless communications.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of a telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, further improvements in LTE technology may be desired. Preferably, these improvements should be applicable to other multi-access technologies and the telecommunication standards that employ these technologies.

In wireless communication systems employing legacy LTE, a plurality of UEs served by a particular evolved Node B (eNB or eNodeB) may be scheduled with resources for communicating with the eNodeB over one or more channels using transmission time intervals (TTI) on the order of about 1 millisecond subframe. As UE capabilities and demand for bandwidth increases, lower latency in communications may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for decoding control information in wireless communication is provided. The method includes receiving wireless communications from a first access point, determining resources of the wireless communications associated with a search space for control information in the received wireless communications, and performing one or more of a set of blind decodes over the search space to decode at least low latency control information associated with a low latency communication technology, where the low latency communication technology utilizes a transmission time interval (TTI) having a duration that is less than a subframe of a legacy communication technology.

In another example, an apparatus for decoding control information in wireless communication is provided. The apparatus includes a transceiver for communicating one or more wireless signals via one or more antennas, a memory configured to store instructions, and one or more processors communicatively coupled with the transceiver and the memory. The one or more processors are configured to receive wireless communications from an access point, determine resources of the wireless communications associated with a search space for control information in the received wireless communications, and perform one or more of a set of blind decodes over the search space to decode at least low latency control information associated with a low latency communication technology, where the low latency communication technology utilizes a TTI having a duration that is less than a subframe of a legacy communication technology.

In another example, an apparatus for decoding control information in wireless communication is provided. The apparatus includes means for receiving wireless communications from an access point, means for determining resources of the wireless communications associated with a search space for control information in the received wireless communications, and means for performing one or more of a set of blind decodes over the search space to decode at least low latency control information associated with a low latency communication technology, where the low latency communication technology utilizes a TTI having a duration that is less than a subframe of a legacy communication technology.

In another example, a computer-readable medium including computer-executable code for decoding control information in wireless communication is provided. The code includes code for receiving wireless communications from an access point, code for determining resources of the wireless communications associated with a search space for control information in the received wireless communications, and code for performing one or more of a set of blind decodes over the search space to decode at least low latency control information associated with a low latency communication technology, where the low latency communication technology utilizes a TTI having a duration that is less than a subframe of a legacy communication technology.

In another example, a method for communicating control information in wireless communications is provided. The method includes defining resources associated with a search space for control information transmitted in the wireless communications, encoding low latency control information associated with a low latency communication technology for transmission in a legacy control channel region in the search space, where the low latency communication technology utilizes a TTI having a duration that is less than a subframe of a legacy communication technology, and transmitting the low latency control information in the legacy control channel region.

In another example, an apparatus for communicating control information in wireless communications is provided that includes a transceiver for communicating one or more wireless signals via one or more antennas, a memory configured to store instructions, and one or more processors communicatively coupled with the transceiver and the memory. The one or more processors are configured to define resources associated with a search space for control information transmitted in the wireless communications, encode low latency control information associated with a low latency communication technology for transmission in a legacy control channel region in the search space, where the low latency communication technology utilizes a TTI having a duration that is less than a subframe of a legacy communication technology, and transmit the low latency control information in the legacy control channel region.

In another example, an apparatus for communicating control information in wireless communications is provided. The apparatus includes means for defining resources associated with a search space for control information transmitted in the wireless communications, means for encoding low latency control information associated with a low latency communication technology for transmission in a legacy control channel region in the search space, where the low latency communication technology utilizes a TTI having a duration that is less than a subframe of a legacy communication technology, and means for transmitting the low latency control information in the legacy control channel region.

In another example, a computer-readable medium including computer-executable code for communicating control information in wireless communications is provided. The code includes code for defining resources associated with a search space for control information transmitted in the wireless communications, code for encoding low latency control information associated with a low latency communication technology for transmission in a legacy control channel region in the search space, where the low latency communication technology utilizes a TTI having a duration that is less than a subframe of a legacy communication technology, and code for transmitting the low latency control information in the legacy control channel region.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

In order to facilitate a fuller understanding of aspects described herein, reference is now made to the accompanying drawings, in which like elements are referenced with like numerals. These drawings should not be construed as limiting the present disclosure, but are intended to be illustrative only.

DETAILED DESCRIPTION

Figure 1:
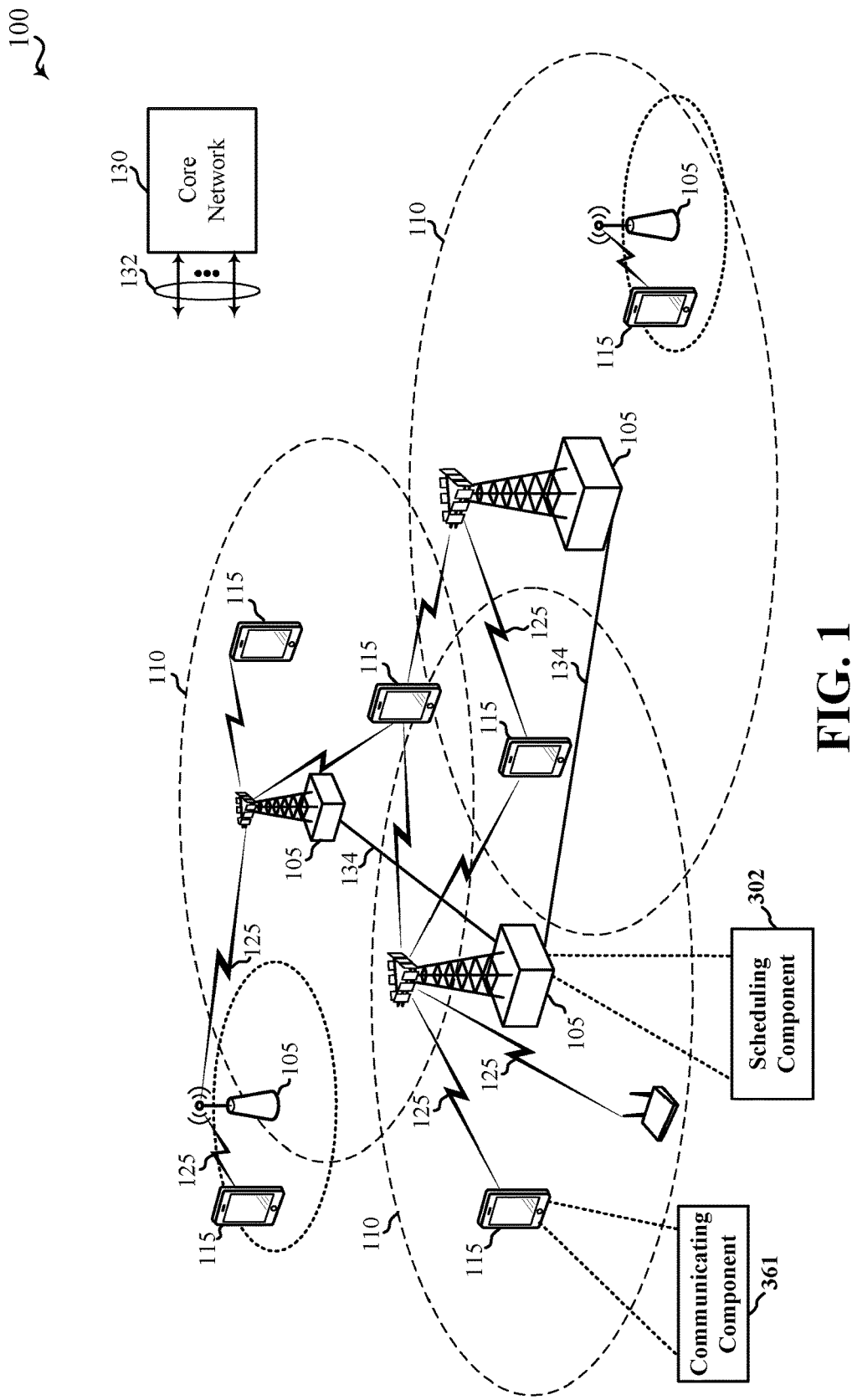
FIG. 1 shows a block diagram conceptually illustrating an example of a telecommunications system, in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Described herein are various aspects related to transmitting and receiving control information in low latency communication technologies. For example, a low latency communication technology, also referred to herein as an ultra-low latency (ULL) communication technology, may be based on a legacy wireless communication technology, such as third generation partnership project (3GPP) long term evolution (LTE), but may utilize different length transmission time intervals (TTI) (e.g., the ULL communication technology may have a shorter TTI duration than the legacy communication technology). For example, a legacy LTE technology may utilize a TTI having a duration of a subframe defined in LTE (e.g., 1 millisecond), where a ULL LTE technology can be based on a TTI having a duration less than a subframe (e.g., a division of a subframe, such as one symbol, two symbols, a subframe slot, etc.). Such a TTI can also be referred to as a short TTI (sTTI). In this regard, a lower latency in communications is achieved by the shorter, more frequent TTI.

Resource allocations for the ULL communication technology may be based on one or more aspects of resource allocation in the legacy communication technology. For example, to achieve latency requirements of the ULL communication technology, it may be preferable for an evolved Node B (eNB), or other node allocating resources to one or more user equipment (UE) or other nodes, to include a ULL physical downlink control channel (uPDCCH, also referred to herein as a short PDCCH (sPDCCH)) within each sTTI of the ULL communication technology. For example, a two symbol sTTI scheduled over a second slot of a subframe or a sTTI scheduled over the second slot of a subframe may not benefit from control information included in legacy control channel (e.g., PDCCH) resources in the first slot of the subframe. However, a first ULL sTTI following the legacy control channel resources may benefit from control information included in the control channel resources (e.g., a two symbol sTTI scheduled over a symbol adjacent to symbols used for legacy control channel resources, a sTTI scheduled over the first slot of the subframe, etc.). In addition, for example, the legacy control channel resources may include first stage grants in a multiple stage grant for ULL communications.

Where legacy control channel resources include the ULL control information, a UE can receive the ULL control information, and the UE may omit monitoring of a first ULL sTTI for ULL control information, or may monitor the first ULL sTTI for additional ULL control information, etc. Additionally, for example, the UE can perform blind decoding for the ULL control information in the legacy control channel resources and/or in the first ULL sTTI following the legacy control channel resources. The number of blind decodes for each of the legacy control channel resources and the first ULL sTTI may be the same or different. Additionally, a number of control channel elements (CCE), resource element groups (REG), aggregation levels, etc. used to indicate the ULL control information in each of the legacy control channel region and the first sTTI following the legacy control channel region can be the same or different.

Where ULL control information is indicated in one or more ULL sTTIs, the eNB can define a ULL search space for indicating resources related to the control information for ULL communications. For example, the ULL search space can be separate from a legacy search space used to indicate the legacy control information. In this example, a UE can be configured to monitor one or more of the ULL search space and/or the legacy search space. In either case, the eNB may define the ULL search space and the legacy search space to use the same or different control information formats, sizes, etc. In another example, the eNB may reduce a size of the legacy search space, a number of aggregation levels associated with the legacy search space, etc. to account for a size of the ULL search space. Moreover, for example, the legacy search space and ULL search space may be located in contiguous (e.g., adjacent and/or overlapping) resources or in non-contiguous resources.

Referring first to FIG. 1, a diagram illustrates an example of a wireless communications system 100, in accordance with aspects described herein. The wireless communications system 100 includes a plurality of access points (e.g., base stations, eNBs, or WLAN access points) 105, a number of user equipment (UEs) 115, and a core network 130. Access points 105 may include a scheduling component 302 configured to allocate resources for communicating with UEs 115 using a legacy communication technology and/or ULL communication technology. Similarly, one or more of UEs 115 may include a communicating component 361 configured to communicate with one or more access points 105 using a legacy (e.g., LTE) and/or ULL communication technology (e.g., ULL LTE). Some of the access points 105 may communicate with the UEs 115 under the control of a base station controller (not shown), which may be part of the core network 130 or the certain access points 105 (e.g., base stations or eNBs) in various examples. Access points 105 may communicate control information and/or user data with the core network 130 through backhaul links 132. In examples, the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

In some examples, at least a portion of the wireless communications system 100 may be configured to operate on multiple hierarchical layers in which one or more of the UEs 115 and one or more of the access points 105 may be configured to support transmissions on a hierarchical layer that has a reduced latency with respect to another hierarchical layer. In some examples, a UE 115 may communicate with access point 105 on one or more of a first hierarchical layer that supports first layer transmissions using a first TTI (which may relate to a "legacy wireless communication technology") and a second hierarchical layer that supports second layer transmissions using a second TTI, which may be shorter than the first TTI (which may relate to a "ULL communication technology").

In other examples, a UE 115 may communicate with an access point 105 on the second hierarchical layer only. Thus, a UE 115 may belong to a second class of UEs 115 that may communicate on the second hierarchical layer, while another UE 115 may belong to a first class of UEs 115 that may communicate on the first hierarchical layer only. In an example, access point 105 and UE 115 may communicate on the second hierarchical layer through transmissions of subframes of a second subframe type. Access point 105 may transmit communications related to the first or second hierarchical layer only or may transmit communications for both the first and second hierarchical layers. Where an access point 105 supports both the first and second hierarchical layers, communicating component 361 can be configured to prioritize communications received from the access point 105 that relate to the first and second hierarchical layers, as described herein.

The access points 105 may wirelessly communicate with the UEs 115 via one or more access point antennas. Each of the access points 105 sites may provide communication coverage for a respective coverage area 110. In some examples, access points 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies (RAT). The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In network communication systems using LTE/LTE-A and/or ULL LTE communication technologies, the terms evolved Node B (eNodeB or eNB) may be generally used to describe the access points 105. The wireless communications system 100 may be a Heterogeneous LTE/LTE-A/ULL LTE network in which different types of access points provide coverage for various geographical regions. For example, each access point 105 may provide communication coverage for a macro cell, a pico cell, a femto cell, and/or other types of cell. Small cells such as pico cells, femto cells, and/or other types of cells may include low power nodes or LPNs. A macro cell may cover a relatively large geographic area (e.g., several kilometers in radius) and may allow unrestricted access by UEs 115 with service subscriptions with the network provider. A small cell may cover a relatively smaller geographic area and may allow unrestricted access by UEs 115 with service subscriptions with the network provider, for example, and in addition to unrestricted access, may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells.

The core network 130 may communicate with the eNBs or other access points 105 via one or more backhaul links 132 (e.g., S1 interface, etc.). The access points 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the access points 105 may have similar frame timing, and transmissions from different access points 105 may be approximately aligned in time. For asynchronous operation, the access points 105 may have different frame timing, and transmissions from different access points 105 may not be aligned in time. Furthermore, transmissions in the first hierarchical layer and second hierarchical layer may or may not be synchronized among access points 105. The techniques described herein may be used for either synchronous or asynchronous operations.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNodeBs, small cell eNodeBs, relays, and the like. A UE 115 may also be able to communicate over different access networks, such as cellular or other WWAN access networks, or WLAN access networks.

The communication links 125 shown in wireless communications system 100 may include uplink (UL) transmissions from a UE 115 to an access point 105, and/or downlink (DL) transmissions, from an access point 105 to a UE 115. The downlink transmissions may also be called forward link transmissions while the uplink transmissions may also be called reverse link transmissions. The communication links 125 may carry transmissions of each hierarchical layer which, in some examples, may be multiplexed in the communication links 125. The UEs 115 may be configured to collaboratively communicate with multiple access points 105 through, for example, Multiple Input Multiple Output (MIMO), carrier aggregation (CA), Coordinated Multi-Point (CoMP), or other schemes. MIMO techniques use multiple antennas on the access points 105 and/or multiple antennas on the UEs 115 to transmit multiple data streams. Carrier aggregation may utilize two or more component carriers on a same or different serving cell for data transmission. CoMP may include techniques for coordination of transmission and reception by a number of access points 105 to improve overall transmission quality for UEs 115 as well as increasing network and spectrum utilization.

As mentioned, in some examples access points 105 and UEs 115 may utilize carrier aggregation to transmit on multiple carriers. In some examples, access points 105 and UEs 115 may concurrently transmit in a first hierarchical layer, within a frame, one or more subframes each having a first subframe type using two or more separate carriers. Each carrier may have a bandwidth of, for example, 20 MHz, although other bandwidths may be utilized. A UE 115 may, in certain examples, receive and/or transmit one or more subframes in a second hierarchical layer utilizing a single carrier that has a bandwidth greater than a bandwidth of one or more of the separate carriers. For example, if four separate 20 MHz carriers are used in a carrier aggregation scheme in the first hierarchical layer, a single 80 MHz carrier may be used in the second hierarchical layer. The 80 MHz carrier may occupy a portion of the radio frequency spectrum that at least partially overlaps the radio frequency spectrum used by one or more of the four 20 MHz carriers. In some examples, scalable bandwidth for the second hierarchical layer type may be combined techniques to provide shorter RTTs such as described above, to provide further enhanced data rates.

Each of the different operating modes that may be employed by wireless communications system 100 may operate according to frequency division duplexing (FDD) or time division duplexing (TDD). In some examples, different hierarchical layers may operate according to different TDD or FDD modes. For example, a first hierarchical layer may operate according to FDD while a second hierarchical layer may operate according to TDD. In some examples, OFDMA communications signals may be used in the communication links 125 for LTE downlink transmissions for each hierarchical layer, while single carrier frequency division multiple access (SC-FDMA) communications signals may be used in the communication links 125 for LTE uplink transmissions in each hierarchical layer. Additional details regarding implementation of hierarchical layers in a system such as the wireless communications system 100, as well as other features and functions related to communications in such systems, are provided below with reference to the following figures.

Figure 2:
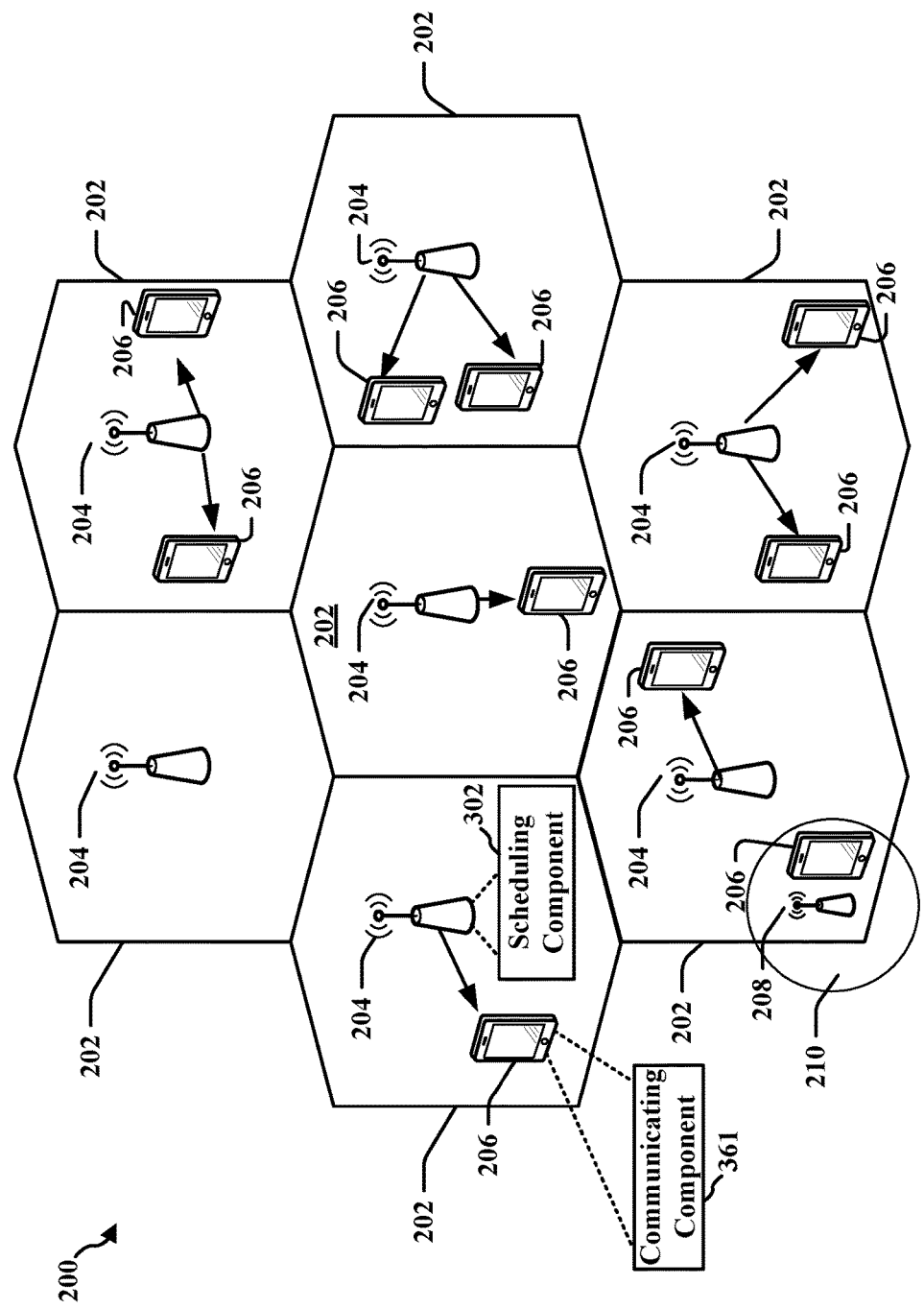
FIG. 2 is a diagram illustrating an example of an access network.

FIG. 2 is a diagram illustrating an example of an access network 200 in an LTE or ULL LTE network architecture. In this example, the access network 200 is divided into a number of cellular regions (cells) 202. One or more small cell eNBs 208 may have cellular regions 210 that overlap with one or more of the cells 202. The small cell eNBs 208 may provide one or more cells of a lower power class, such as a femto cell (e.g., home eNB (HeNB)), pico cell, micro cell, or remote radio head (RRH). The macro eNBs 204 are each assigned to a respective cell 202 and are configured to provide an access point to the core network 130 for all the UEs 206 in the cells 202. In an aspect, eNBs 204 and/or 208 may include scheduling component 302 configured to allocate resources for communicating with UEs 206 using a legacy and/or ULL communication technology. Similarly, one or more of UEs 206 may include a communicating component 361 configured to communicate with one or more eNBs 204 and/or 208 using the legacy (e.g., LTE) and/or ULL communication technology (e.g., ULL LTE). There is no centralized controller in this example of an access network 200, but a centralized controller may be used in alternative configurations. The eNBs 204 are responsible for all radio related functions including radio bearer control, admission control, mobility control, scheduling, security, and connectivity to one or more components of core network 130.

The modulation and multiple access scheme employed by the access network 200 may vary depending on the particular telecommunications standard being deployed. In LTE or ULL LTE applications, OFDM may be used on the DL and SC-FDMA may be used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
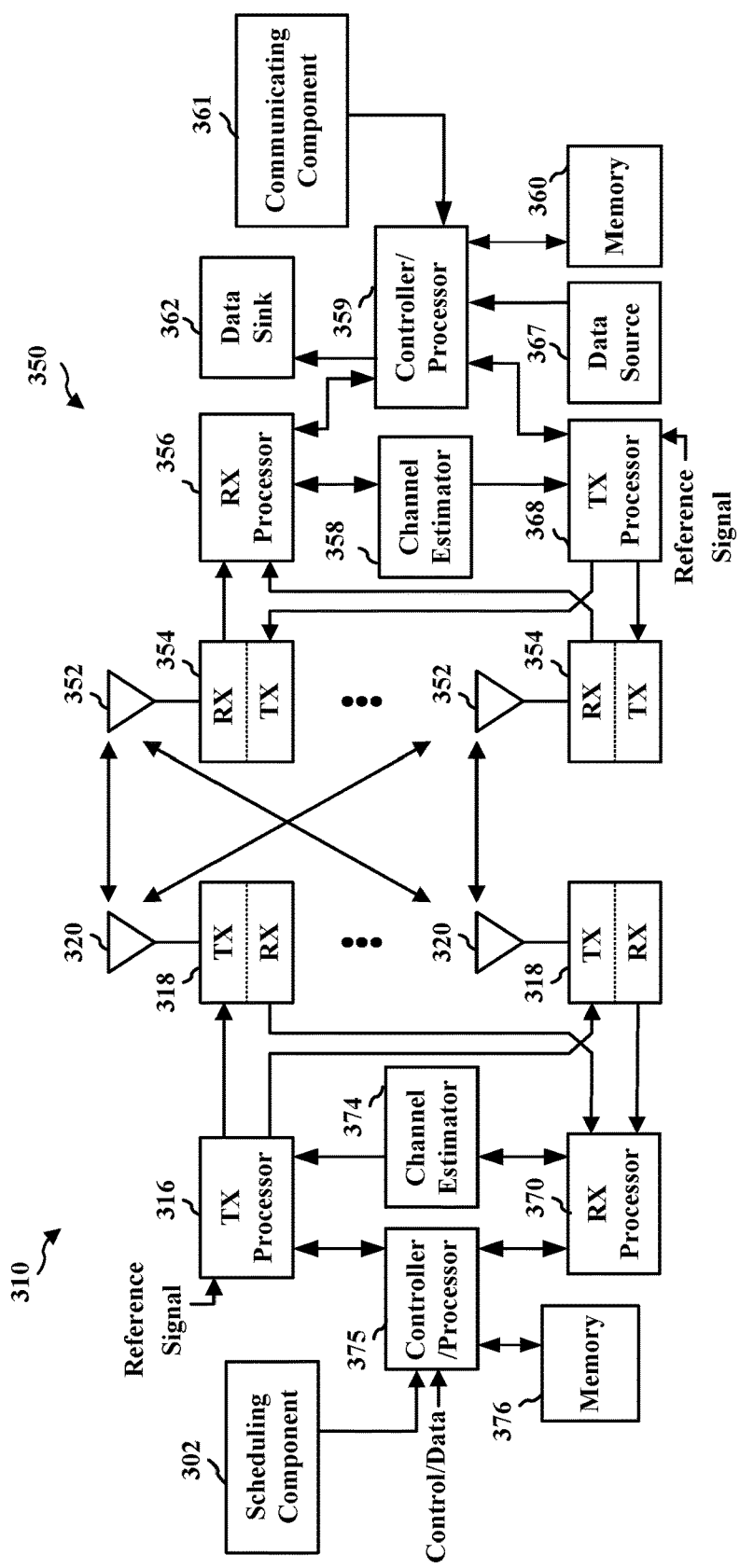
FIG. 3 is a diagram illustrating an example of an evolved Node B and user equipment in an access network.

FIG. 3 is a block diagram of an eNB 310 in communication with a UE 350 in an access network. In the DL, upper layer packets from the core network are provided to a controller/processor 375. The controller/processor 375 implements the functionality of the L2 layer. In the DL, the controller/processor 375 provides header compression, ciphering, packet segmentation and reordering, multiplexing between logical and transport channels, and radio resource allocations to the UE 350 based on various priority metrics. The controller/processor 375 is also responsible for HARQ operations, retransmission of lost packets, and signaling to the UE 350.

The transmit (TX) processor 316 implements various signal processing functions for the L1 layer (i.e., physical layer). The signal processing functions includes coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot signal) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream is then provided to a different antenna 320 via a separate transmitter 318TX. Each transmitter 318TX modulates an RF carrier with a respective spatial stream for transmission.

In addition, eNB 310 may include scheduling component 302 configured to allocate resources for communicating with a UE 350 using a legacy and/or ULL communication technology. Though scheduling component 302 is shown as coupled with controller/processor 375, substantially any processor of an eNB 310 can provide the functions of the scheduling component 302 and/or its related components described herein (e.g., in conjunction with controller/processor 375, memory 376, or otherwise). For example, TX processor 316 and/or RX processor 370 can additionally or alternatively provide one or more functions of scheduling component 302, as described herein.

At the UE 350, each receiver 354RX receives a signal through its respective antenna 352. Each receiver 354RX recovers information modulated onto an RF carrier and provides the information to the receive (RX) processor 356. The RX processor 356 implements various signal processing functions of the L1 layer. The RX processor 356 performs spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359.

The controller/processor 359 implements the L2 layer. The controller/processor can be associated with a memory 360 that stores program codes and data. The memory 360 may be referred to as a computer-readable medium. In the UL, the controller/processor 359 provides demultiplexing between transport and logical channels, packet reassembly, deciphering, header decompression, control signal processing to recover upper layer packets from the core network. The upper layer packets are then provided to a data sink 362, which represents all the protocol layers above the L2 layer. Various control signals may also be provided to the data sink 362 for L3 processing. The controller/processor 359 is also responsible for error detection using an acknowledgement (ACK) and/or negative acknowledgement (NACK) protocol to support HARQ operations.

In addition, communicating component 361 may be configured to communicate with one or more access points 105 using a legacy (e.g., LTE) and/or ULL communication technology (e.g., ULL LTE). Though communicating component 361 is shown as coupled with controller/processor 359, substantially any processor of a UE 350 can provide the functions of the communicating component 361 and/or its related components described herein (e.g., in conjunction with controller/processor 359, memory 360, or otherwise). For example, TX processor 368 and/or RX processor 356 can additionally or alternatively provide one or more functions of communicating component 361, as described herein.

In the UL, a data source 367 is used to provide upper layer packets to the controller/processor 359. The data source 367 represents all protocol layers above the L2 layer. Similar to the functionality described in connection with the DL transmission by the eNB 310, the controller/processor 359 implements the L2 layer for the user plane and the control plane by providing header compression, ciphering, packet segmentation and reordering, and multiplexing between logical and transport channels based on radio resource allocations by the eNB 310. The controller/processor 359 is also responsible for HARQ operations, retransmission of lost packets, and signaling to the eNB 310.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 are provided to different antenna 352 via separate transmitters 354TX. Each transmitter 354TX modulates an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The RX processor 370 may implement the L1 layer.

The controller/processor 375 implements the L2 layer. The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

Figure 4:
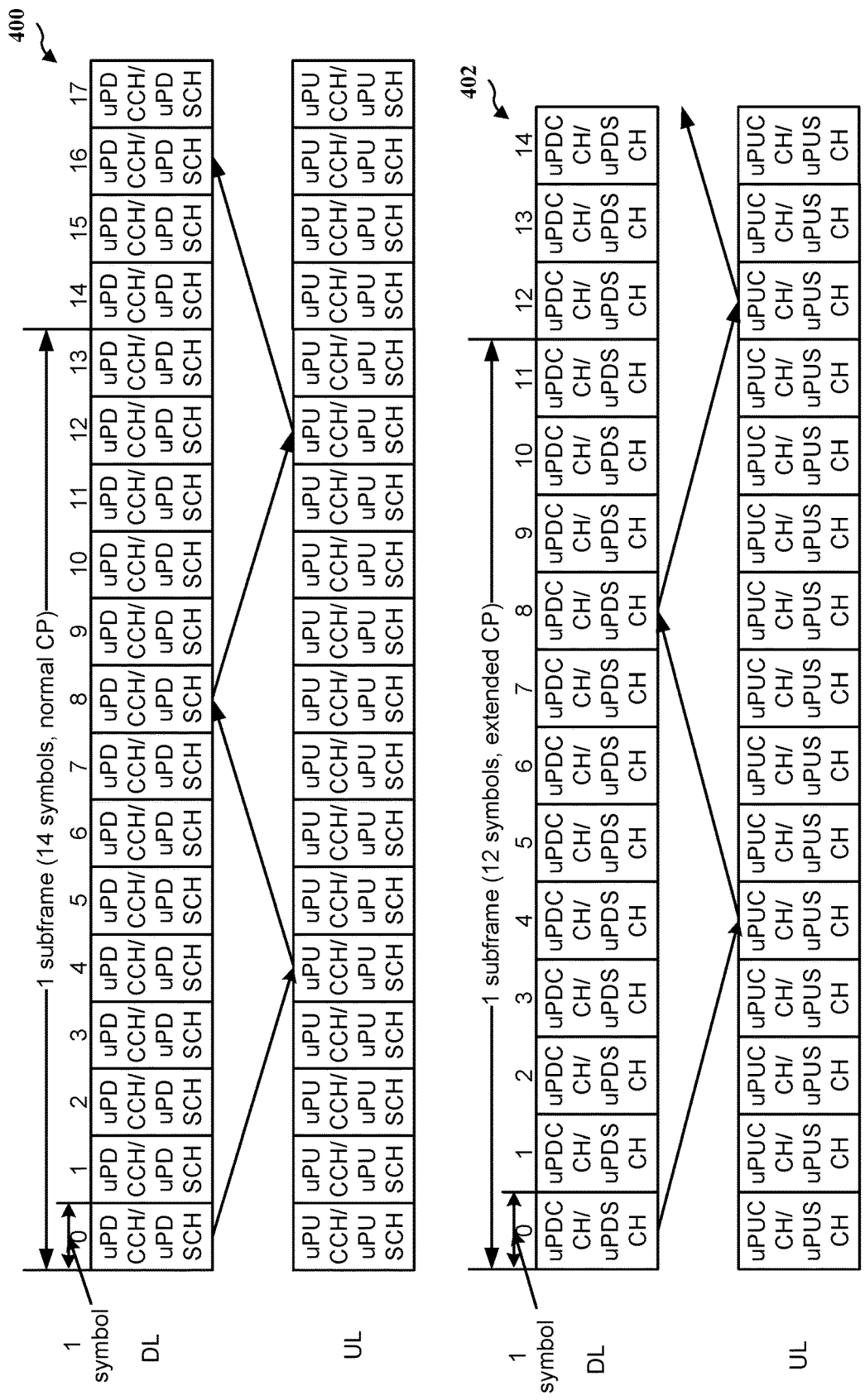
FIG. 4 is a diagram illustrating examples of timelines for ultra low latency (ULL) bandwidth allocation.

FIG. 4 is a diagram illustrating non-limiting examples of a ULL timelines 400, 402, with time progression extending from left to right in the figure, for managing ULL communications in a wireless communication system. In this example, timelines 400, 402 include ULL frames of symbol duration in each symbol of a subframe, though in other examples the ULL timelines may use TTIs that are two symbols, one slot, etc. in duration. Timelines 400, 402 both depict symbols representing a TTI for ULL physical downlink control channel (uPDCCH) and/or ULL physical downlink shared channel (uPDSCH) and symbols representing a TTI including ULL physical uplink control channel (uPUCCH) and/or ULL physical uplink shared channel (uPUSCH). In timelines 400, 14 symbols are shown within a given subframe (e.g., for normal CP), and in timelines 402, 12 symbols are shown within a given subframe (e.g., for extended CP). In either case, lower latency is achieved in ULL by utilizing symbol-based TTIs. In other examples, a TTI may be two or more symbols, a slot of a subframe (where a subframe includes two slots), etc. In addition, HARQ process response time can be 3 symbols (or 4 symbols, 3 dual-symbols, 3 slots, etc.). In the depicted example, uPDCCH/uPDSCH is sent in symbol 0, and HARQ is processed and is sent in symbol 4, etc. in the subframe. Moreover, in accordance with aspects described herein, some symbols within a given subframe can be allocated for downlink communications (e.g., uPDCCH/uPDSCH) while other symbols are allocated for uplink communications (e.g., uPUCCH/uPUSCH).

Referring to FIGS. 5-9, aspects are depicted with reference to one or more components and one or more methods that may perform the actions or functions described herein. In an aspect, the term "component" as used herein may be one of the parts that make up a system, may be hardware or software or some combination thereof, and may be divided into other components. Although the operations described below in FIGS. 6-9 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

Figure 5:
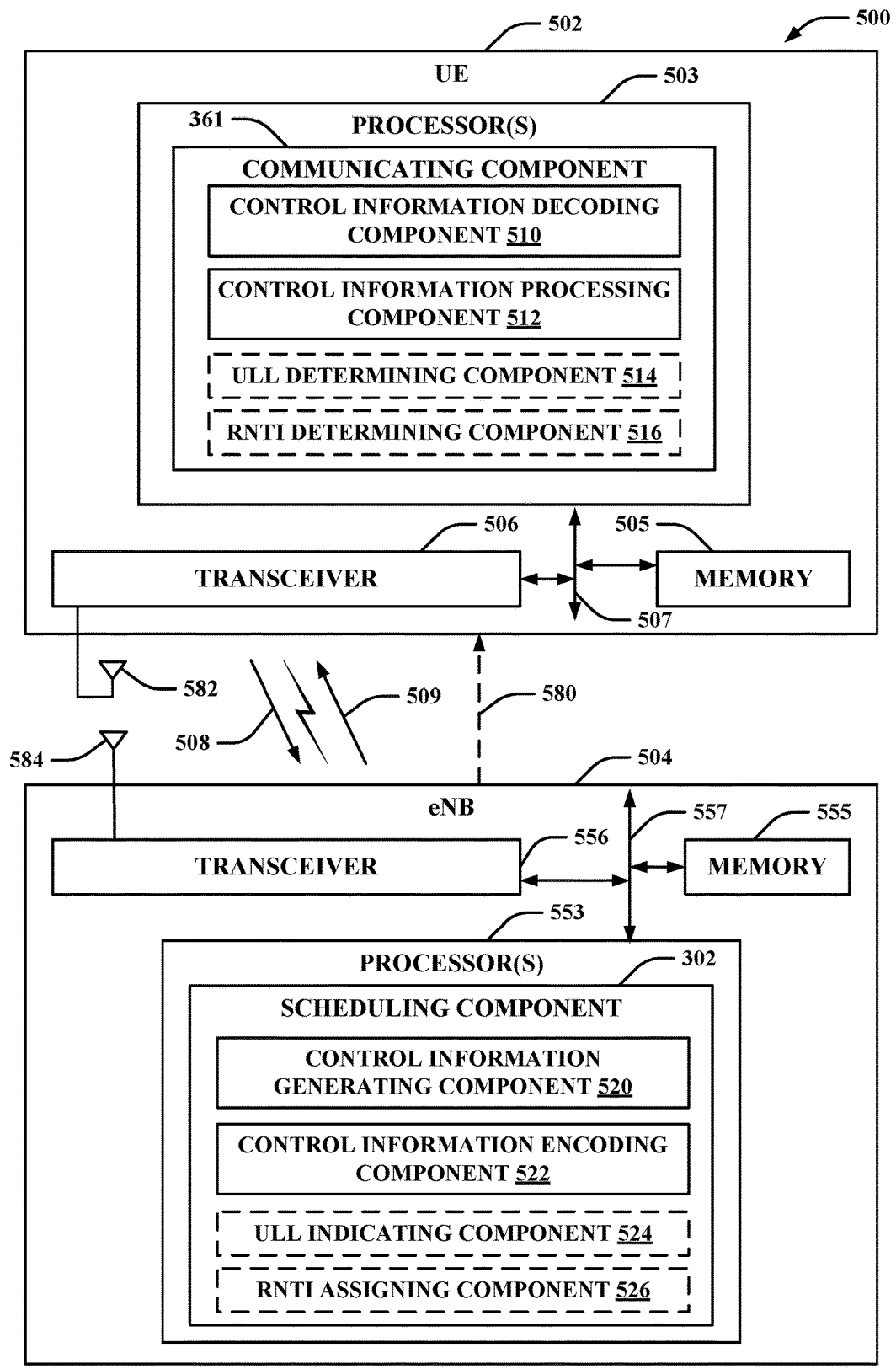
FIG. 5 is a diagram illustrating an example of a system for communicating in a low latency and/or legacy communication technology in accordance with aspects described herein.

FIG. 5 illustrates an example of a system 500 for scheduling ULL and/or legacy communications. System 500 includes a UE 502 that communicates with an eNB 504 to access a wireless network, examples of which are described in FIGS. 1-3 (e.g., access points 105, eNB 204, small cell eNB 208, eNB 310, UEs 115, 206, 350, etc.), above. In an aspect, eNB 504 and UE 502 may establish one or more downlink channels over which to communicate via downlink signals 509, which can be transmitted by eNB 504 (e.g., via transceiver 556) and received by UE 502 (e.g., via transceiver 506) for communicating control and/or data messages (e.g., in signaling) from the eNB 504 to the UE 502 over configured communication resources, as described further herein. Moreover, for example, eNB 504 and UE 502 may establish one or more uplink channels over which to communicate via uplink signals 508, which can be transmitted by UE 502 (e.g., via transceiver 506) and received by eNB 504 (e.g., via transceiver 556) for communicating control and/or data messages (e.g., in signaling) from the UE 502 to the eNB 504 over configured communication resources, as described herein. For example, eNB 504 may communicate a resource grant 580 that can indicate resources over which the UE 502 is to communicate (e.g., transmit or receive) data with eNB 504, where the resources can correspond to a legacy communication technology, a ULL communication technology, etc., as described. For example, resources related to a ULL communication technology can be based on a ULL timeline (e.g., a timeline having a TTI that is less than a subframe in duration, such as the timelines 400, 402 in FIG. 4).

In an aspect, UE 502 may include one or more processors 503 and/or a memory 505 that may be communicatively coupled, e.g., via one or more buses 507, and may operate in conjunction with or otherwise implement a communicating component 361 for communicating using a legacy and/or ULL communication technology based on one or more resource grants. For example, the various operations related to communicating component 361 may be implemented or otherwise executed by one or more processors 503 and, in an aspect, can be executed by a single processor, while in other aspects, different ones of the operations may be executed by a combination of two or more different processors. For example, in an aspect, the one or more processors 503 may include any one or any combination of a modem processor, or a baseband processor, or a digital signal processor, or an application specific integrated circuit (ASIC), or a transmit processor, receive processor, or a transceiver processor associated with transceiver 506. Further, for example, the memory 505 may be a non-transitory computer-readable medium that includes, but is not limited to, random access memory (RAM), read only memory (ROM), programmable ROM (PROM), erasable PROM (EPROM), electrically erasable PROM (EEPROM), a magnetic storage device (e.g., hard disk, floppy disk, magnetic strip), an optical disk (e.g., compact disk (CD), digital versatile disk (DVD)), a smart card, a flash memory device (e.g., card, stick, key drive), a register, a removable disk, and any other suitable medium for storing software and/or computer-readable code or instructions that may be accessed and read by a computer or one or more processors 503. Moreover, memory 505 or computer-readable storage medium may be resident in the one or more processors 503, external to the one or more processors 503, distributed across multiple entities including the one or more processors 503, etc.

In particular, the one or more processors 503 and/or memory 505 may execute actions or operations defined by communicating component 361 or its subcomponents. For instance, the one or more processors 503 and/or memory 505 may execute actions or operations defined by a control information decoding component 510 for decoding control information corresponding to a low latency communication technology and/or a legacy communication technology. In an aspect, for example, control information decoding component 510 may include hardware (e.g., one or more processor modules of the one or more processors 503) and/or computer-readable code or instructions stored in memory 505 and executable by at least one of the one or more processors 503 to perform the specially configured control information decoding operations described herein. Further, for instance, the one or more processors 503 and/or memory 505 may execute actions or operations defined by a control information processing component 512 for processing and/or utilizing control information received from one or more eNBs. In an aspect, for example, control information processing component 512 may include hardware (e.g., one or more processor modules of the one or more processors 503) and/or computer-readable code or instructions stored in memory 505 and executable by at least one of the one or more processors 503 to perform the specially configured control information processing operations described herein.

Further, for instance, the one or more processors 503 and/or memory 505 may execute actions or operations defined by an optional ULL determining component 514 for determining one or more parameters related to a ULL communication technology for which control information is received. In an aspect, for example, ULL determining component 514 may include hardware (e.g., one or more processor modules of the one or more processors 503) and/or computer-readable code or instructions stored in memory 505 and executable by at least one of the one or more processors 503 to perform the specially configured ULL determining operations described herein. Further, for instance, the one or more processors 503 and/or memory 505 may execute actions or operations defined by an optional radio network temporary identifier (RNTI) determining component 516 for determining one or more RNTIs, or other identifiers, that can be used for locating a control channel search space in a ULL and/or legacy communication technology. In an aspect, for example, RNTI determining component 516 may include hardware (e.g., one or more processor modules of the one or more processors 503) and/or computer-readable code or instructions stored in memory 505 and executable by at least one of the one or more processors 503 to perform the specially configured RNTI determining operations described herein.

Similarly, in an aspect, eNB 504 may include one or more processors 553 and/or a memory 555 that may be communicatively coupled, e.g., via one or more buses 557, and may operate in conjunction with or otherwise implement a scheduling component 302 for generating resource grants and/or related control information for one or more UEs for ULL wireless communications. For example, the various functions related to scheduling component 302 may be implemented or otherwise executed by one or more processors 553 and, in an aspect, can be executed by a single processor, while in other aspects, different ones of the functions may be executed by a combination of two or more different processors, as described above. In one example, the one or more processors 553 and/or memory 555 may be configured as described in examples above with respect to the one or more processors 503 and/or memory 505 of UE 502.

In an example, the one or more processors 553 and/or memory 555 may execute actions or operations defined by scheduling component 302 or its subcomponents. For instance, the one or more processors 553 and/or memory 555 may execute actions or operations defined by a control information generating component 520 for generating control information for one or more UEs corresponding at least to a low latency communication technology and/or a legacy communication technology. In an aspect, for example, control information generating component 520 may include hardware (e.g., one or more processor modules of the one or more processors 553) and/or computer-readable code or instructions stored in memory 555 and executable by at least one of the one or more processors 553 to perform the specially configured control information generating operations described herein. Further, for instance, the one or more processors 553 and/or memory 555 may execute actions or operations defined by a control information encoding component 522 for encoding the control information related to at least to a low latency communication technology and/or a legacy communication technology for transmitting over one or more search spaces. In an aspect, for example, control information encoding component 522 may include hardware (e.g., one or more processor modules of the one or more processors 553) and/or computer-readable code or instructions stored in memory 555 and executable by at least one of the one or more processors 553 to perform the specially configured control information encoding operations described herein.

Further, for instance, the one or more processors 553 and/or memory 555 may execute actions or operations defined by an optional ULL indicating component 524 for indicating one or more parameters related to a low latency communication technology. In an aspect, for example, ULL indicating component 524 may include hardware (e.g., one or more processor modules of the one or more processors 553) and/or computer-readable code or instructions stored in memory 555 and executable by at least one of the one or more processors 553 to perform the specially configured ULL indicating operations described herein. Further, for instance, the one or more processors 553 and/or memory 555 may execute actions or operations defined by an optional RNTI assigning component 526 for assigning one or more RNTIs to a UE, or other identifiers that can be used for locating a search space corresponding to at least one of a low latency communication technology and/or a legacy communication technology. In an aspect, for example, RNTI assigning component 526 may include hardware (e.g., one or more processor modules of the one or more processors 553) and/or computer-readable code or instructions stored in memory 555 and executable by at least one of the one or more processors 553 to perform the specially configured RNTI assigning operations described herein.

In an example, transceivers 506, 556 may be configured to transmit and receive wireless signals through one or more antennas 582, 584 and may generate or process the signals using one or more RF front end components (e.g., power amplifiers, low noise amplifiers, filters, analog-to-digital converters, digital-to-analog converters, etc.), one or more transmitters, one or more receivers, etc. In an aspect, transceivers 506, 556 may be tuned to operate at specified frequencies such that UE 502 and/or eNB 504 can communicate at a certain frequency. In an aspect, the one or more processors 503 may configure transceiver 506 and/or one or more processors 553 may configure transceiver 556 to operate at a specified frequency and power level based on a configuration, a communication protocol, etc. to communicate uplink signals 508 and/or downlink signals 509, respectively, over related uplink or downlink communication channels.

In an aspect, transceivers 506, 556 can operate in multiple bands (e.g., using a multiband-multimode modem, not shown) such to process digital data sent and received using transceivers 506, 556. In an aspect, transceivers 506, 556 can be multiband and be configured to support multiple frequency bands for a specific communications protocol. In an aspect, transceivers 506, 556 can be configured to support multiple operating networks and communications protocols. Thus, for example, transceivers 506, 556 may enable transmission and/or reception of signals based on a specified modem configuration.

Figure 6:
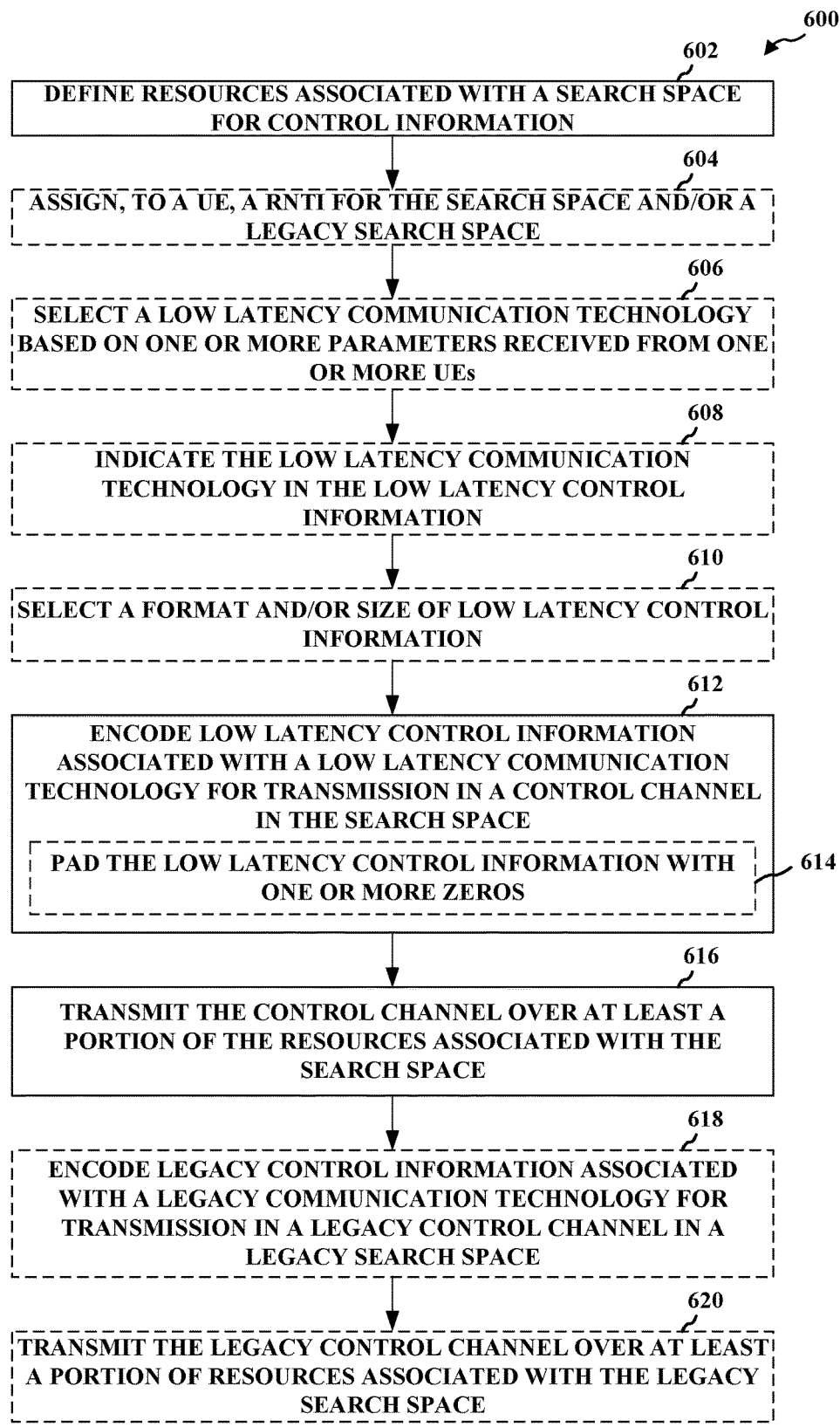
FIG. 6 is a flow chart of an example of a first method for encoding low latency control information in accordance with aspects described herein.

FIG. 6 illustrates an example of a method 600 for transmitting (e.g., by an eNB) control information over one or more search spaces. In method 600, blocks indicated as dashed boxes represent optional steps.

At Block 602, the eNB may define resources associated with a search space for control information. In an aspect, scheduling component 302, e.g., in conjunction with processor(s) 553, memory 555, and/or transceiver 556, can define the resources associated with the search space for the control information. For example, scheduling component 302 can define the resources as a portion of frequency (e.g., a system bandwidth) over a period of time according to a standard for the communication technology (e.g., LTE). In an example, the search space can include a common search space (CSS), a UE-specific search space (DESS), which can be indicated to the UE in one or more communications from the eNB 504 (e.g., as part of a random access procedure performed by the UE 502 and eNB 504), and/or the like. In an example, the eNB 504 can utilize the search space to transmit control information for one or more UEs, and the one or more UEs can search the search space for control information related to the given UE (e.g., based on an assigned RNTI).

In one example, scheduling component 302 may define a first set of resources associated with legacy control information and a second set of resources associated with low latency control information. The first set of resources may be contiguous (e.g., overlapping or adjacent) to the second set of resources in frequency and/or time, in one example, or may be non-contiguous. Moreover, in an example, scheduling component 302 may define a search space for the low latency communication technology within a legacy control channel region (e.g., PDCCH region) of the legacy communication technology. In yet an additional or alternative example, scheduling component 302 may define the search space for the low latency communication technology to include one or more low latency sTTIs following the legacy control channel region (e.g., one or more low latency TTIs adjacent to the legacy control channel region or otherwise).

At Block 604, the eNB may optionally assign, to the UE a RNTI for the search space and/or a legacy search space. In an aspect, RNTI assigning component 526, e.g., in conjunction with processor(s) 553, memory 555, and/or transceiver 556, can assign, to the UE (e.g., UE 502), a RNTI for the search space and/or the legacy search space. For example, where the search space and the legacy search space are over different resources, RNTI assigning component 526 can assign the UE 502 an RNTI for the search space and a different RNTI for the legacy search space to allow the UE 502 to locate the search spaces for obtaining related control information. For example, the RNTIs may correspond to cell RNTIs (C-RNTI), which UE 502 can utilize to demask a cyclic redundancy check (CRC) for signals received in the search space (e.g., the legacy or low latency search space using corresponding C-RNTIs) and/or to find the starting point of the search space.

At Block 606, the eNB may optionally select a low latency communication technology based on one or more parameters received from one or more UEs. In an aspect, ULL indicating component 524, e.g., in conjunction with processor(s) 553, memory 555, and/or transceiver 556, can select a low latency communication technology for the UE based on one or more parameters received from one or more UEs. For example, in selecting the low latency communication technology, the eNB can receive or determine parameters such as traffic statistics (e.g., throughput), packet sizes, channel quality indicator (CQI), etc., and ULL indicating component 524 can accordingly choose a sTTI length for the low latency communication technology for the UE 502 (e.g., at least for downlink communications to the UE 502). Similarly, ULL indicating component 524 can select a sTTI length for the low latency communication technology for uplink communications from the UE based on buffer status report (BSR) or other parameters received from the UE 502. In either case, for small packet sizes, ULL indicating component 524 can select a low latency communication technology, while selecting a legacy communication technology for larger packet sizes.

At Block 608, the eNB may optionally indicate the low latency communication technology in the low latency control information. In an aspect, ULL indicating component 524, e.g., in conjunction with processor(s) 553, memory 555, and/or transceiver 556, can indicate the low latency communication technology in the low latency control information. For example, the eNB may not support both low latency and legacy control information for a given UE (e.g., where eNB determines to use a low latency communication technology in communicating with the UE). In this example, ULL indicating component 524 can indicate at least one of whether the control information is legacy or low latency control information, a duration of a sTTI associated with the low latency control information, etc. within the control information, in higher layer signaling (e.g., radio resource control (RRC) signaling), and/or the like.

At Block 610, the eNB may optionally select a format and/or size of low latency control information. In an aspect, control information encoding component 522, e.g., in conjunction with processor(s) 553, memory 555, and/or transceiver 556, can select the format and/or size of low latency control information (e.g., a downlink control information (DCI) size). For example, control information encoding component 522 may select one or more formats and/or sizes for the low latency control information based on at least one of a format or size utilized in the legacy communication technology (e.g., a size for DCI in LTE), the duration of the sTTI of the low latency communication technology, etc. In addition, for example, control information encoding component 522 can select a CCE size for the low latency control information that is the same as or different from the CCE size defined and/or used for legacy control information. Moreover, for example, control information encoding component 522 can select the CCE size for low latency control information based on a duration of the sTTI for the low latency communication technology, a number of antenna ports, a resource allocation granularity, number of HARQ processes, etc. for the low latency communication technology, which may be based on a duration of the sTTI of the low latency communication technology.

At Block 612, the eNB may encode low latency control information associated with a low latency communication technology for transmission in a control channel in the search space. In an aspect, control information encoding component 522, e.g., in conjunction with processor(s) 553, memory 555, and/or transceiver 556, can encode low latency control information associated with a low latency communication technology for transmission in the control channel in the search space. In an example, control information encoding component 522 can encode the low latency control information in the search space that includes at least a portion of a legacy control channel region (e.g., PDCCH region in LTE). For example, control information encoding component 552 can encode the low latency control information based at least in part on one or more formats and/or sizes selected (e.g., in Block 610). In a specific example, in encoding the low latency control information at Block 612, the UE, at Block 614, can optionally pad the low latency control information with one or more zeros (e.g., where control information encoding component 552 selects a size for the low latency control information that is the same as a size of legacy control information, but there is not enough low latency control information to fill the size).

At Block 616, the eNB can transmit the control channel over at least a portion of the resources associated with the search space. In an aspect, scheduling component 302, e.g., in conjunction with processor(s) 553, memory 555, and/or transceiver 556, can transmit the control channel over at least the portion of the resources associated with the search space. In this example, the UE 502 can receive communications over the resources and attempt to decode the control channel based on an assigned RNTI or other parameters determined regarding the search space.

Additionally, the eNB can transmit legacy control information along with the low latency control information (e.g., in a separate search space, as described). Thus, at Block 618, eNB may optionally encode legacy control information associated with a legacy communication technology for transmission in a legacy control channel in a legacy search space, and at Block 620, can transmit the legacy control channel over at least a portion of resources associated with the legacy search space. In an aspect, control information encoding component 522, e.g., in conjunction with processor(s) 553, memory 555, and/or transceiver 556, can encode legacy control information associated with the legacy communication technology for transmission in the legacy control channel in the legacy search space, and/or scheduling component 302 can transmit the legacy control channel over at least the portion of resources associated with the legacy search space. As described, the search space and the legacy search space may be allocated in contiguous or non-contiguous time and/or frequency resources. In addition, selecting a format and/or size of the low latency control information at Block 610 can be based on encoding the legacy control information at Block 618.

For example, control information encoding component 522 can select the size of the control information to be the same as sizes defined for legacy control information (e.g., legacy DCI sizes). As described, in this example, ULL indicating component 524 can include an indicator at least in the low latency control information to allow distinguishing from the legacy control information. In another example, control information encoding component 522 can reduce a search space size for the low latency control information and/or the legacy control information by modifying one or more related parameters for blind decoding. For example, in encoding the legacy control information at Block 618, control information encoding component 522 may reduce a number of decoding candidates per aggregation level to provide space for decoding candidates in encoding the low latency control information at Block 612. In an example, the total size of the reduced legacy search space and the search space for the low latency communication technology can be similar to the size of the legacy search space before reduction.

In another example, in encoding the low latency control information at Block 612, control information encoding component 522 can utilize a number of aggregation levels possibly associated with the encoding that are less than the number of aggregation levels defined for using in encoding the legacy control information. Similarly, in an example, in encoding the legacy control information at Block 618, control information encoding component 522 can utilize a reduced number of aggregation levels, which may be the same as or different from those used to encode the low latency control information to allow for additionally encoding the low latency control information without changing a size of the overall search space. In an example, control information encoding component 522 may communicate the number of aggregation levels, and/or explicitly indicate the possible aggregation levels, for low latency and/or or legacy control information decoding to the UE 502 (e.g., in RRC signaling) to assist in reducing the search space (e.g., reducing the number of blind decodes for the control information). Additional aggregation levels can be used as well (e.g., levels 3 and 6 instead of or in addition to levels 1, 2, 4, 8).

In yet another example, in encoding the low latency control information at Block 612, control information encoding component 522 can utilize a number of possible sizes for the control information (e.g., DCI sizes) that is less than the number of DCI sizes defined for using in encoding the legacy control information. Similarly, in an example, in encoding the legacy control information at Block 618, control information encoding component 522 can utilize a reduced number of DCI sizes, which may be the same as or different from those used to encode the low latency control information for additionally encoding the low latency control information without changing a size of the overall search space. In other examples, control information encoding component 522 can utilize any combination of the above examples in encoding low latency and/or legacy control information (e.g., split the search space between legacy and low latency control information while reducing the number of aggregation levels and/or control information sizes, keeping the same size search space but reducing both the number of aggregation levels and control information sizes, etc.).

Figure 7:
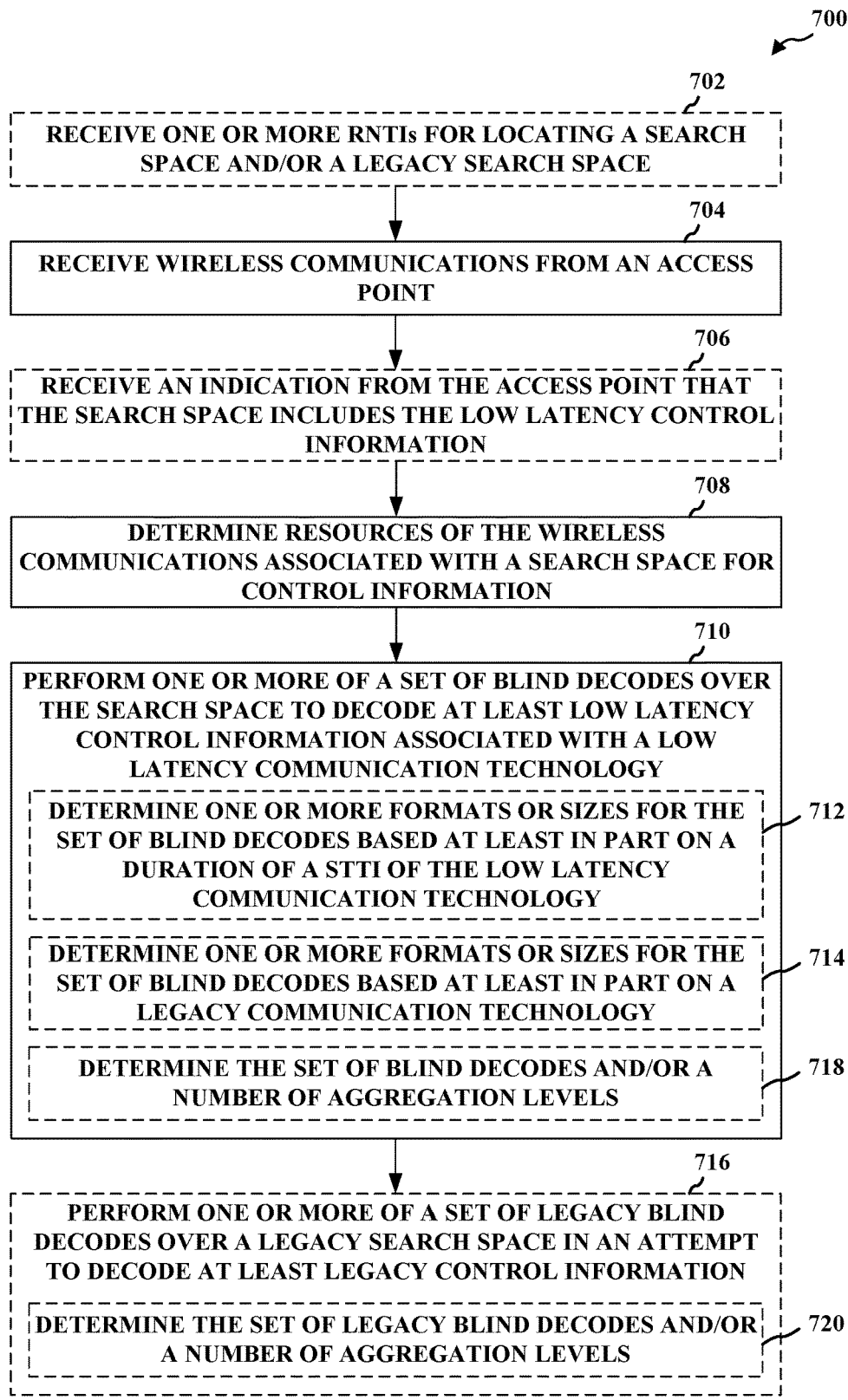
FIG. 7 is a flow chart of an example of a first method for decoding low latency control information in accordance with aspects described herein.

FIG. 7 illustrates an example of a method 700 for receiving (e.g., by a UE) control information over one or more search spaces. In method 700, blocks indicated as dashed boxes represent optional steps.

At Block 702, the UE can optionally receive one or more RNTIs for locating a search space and/or a legacy search space. In an aspect, RNTI determining component 516, e.g., in conjunction with processor(s) 503, memory 505, and/or transceiver 506, can receive the one or more RNTIs for locating the search space and/or legacy search space. For example, where the search space and legacy search space are located in non-contiguous resources, RNTI determining component 516 can determine an RNTI for the search space and an RNTI for the legacy search space based on communications received from the eNB 504 (e.g., a random access response). Where the search space and legacy search space are located in contiguous resources, however, one RNTI can be received and used to locate the contiguous resources. In any case, UE 502 can utilize the RNTI(s) to locate control information in one or more of the search space or the legacy search space.

In a specific example, the UE 502 can be expected to search either for legacy or ULL control in UESS. Thus, the UE 502 can search the UESS for either legacy or ULL control information using a corresponding RNTI. In this example, CSS can be used for a fallback operation, such that the UE can search the CSS if control information cannot be located in the UESS using the RNTI(s).

At Block 704, the UE can receive wireless communications from an access point. In an aspect, communicating component 361, e.g., in conjunction with processor(s) 503, memory 505, and/or transceiver 506, can receive wireless communications from the access point (e.g., eNB 504). For example, the UE can receive the communications in a search space (e.g., a CSS, UESS, etc.), which can include low latency and/or legacy control information from the eNB 504, as described.

At Block 706, the UE can optionally receive an indication from the access point that the search space includes the low latency control information. In an aspect, ULL determining component 514, e.g., in conjunction with processor(s) 503, memory 505, and/or transceiver 506, can receive the indication from the access point (e.g., eNB 504) that the search space includes the low latency control information. For example, ULL determining component 514 can receive the indication in the low latency control information, in higher layer signaling (e.g., RRC signaling), etc., and the control information decoding component 510 can accordingly attempt to decode low latency control information in a corresponding search space where the indicator indicates that the search space includes low latency control information. As described, eNB 504 can determine whether to utilize low latency or legacy resources (and accordingly whether to transmit low latency or legacy control information) based on one or more parameters related to the UE 502 (e.g., traffic statistics, packet sizes, CQI, BSR, etc.), and can accordingly indicate low latency in the indicator where eNB 504 determines to communicate with the UE 502 using the low latency communication technology. Moreover, for example, the indication may include a duration of a sTTI for the low latency communication technology, which the ULL determining component 514 can obtain and utilize to determine one or more additional parameters for decoding the low latency control information (e.g., one or more possible formats, sizes, aggregation levels, or other parameters for determining a set of blind decodes to be performed over the search space, as described).

At Block 708, the UE can determine resources of the wireless communications associated with a search space for control information. In an aspect, control information decoding component 510, e.g., in conjunction with processor(s) 503, memory 505, and/or transceiver 506, can determine the resources of the wireless communications associated with the search space for control information. As described, for example, control information decoding component 510 can attempt to demask a CRC of the communications (or at least a portion thereof) using one or more assigned RNTIs to determine whether the resources correspond to low latency and/or legacy control information associated with the RNTI(s).

At Block 710, the UE can perform one or more of a set of blind decodes over the search space to decode at least low latency control information associated with a low latency communication technology. In an aspect, control information decoding component 510, e.g., in conjunction with processor(s) 503, memory 505, and/or transceiver 506, can perform the one or more of the set of blind decodes over the search space to decode at least low latency control information associated with the low latency communication technology. Moreover, the set can include one or more blind decodes.

In an example, in performing the one or more of the set of blind decodes, the UE may optionally, at Block 712, determine one or more formats or sizes for the set of blind decodes based at least in part on a duration of a sTTI of the low latency communication technology. In an aspect, control information decoding component 510, e.g., in conjunction with processor(s) 503, memory 505, and/or transceiver 506, can determine the one or more formats or sizes (e.g., DCI formats to sizes) for the set of blind decodes based at least in part on the duration of the sTTI of the low latency communication technology. For example, different possible sTTI durations (e.g., one symbol, two symbol, one slot, etc.) can each have different possible formats and/or sizes, etc. In addition, the formats and/or sizes for a given sTTI duration (and/or for all TTI durations) may be the same as or different from formats and/or sizes defined for the legacy communication technology, as described. In an example, an association of formats or sizes to the duration of the sTTI may be known or configured in the UE 502 (e.g., based on a hardcoded configuration, a configuration received from the eNB 504 or a configuration received from another network component, etc.).

For example, in performing the one or more of the set of blind decodes, the UE may optionally, at Block 714, determine one or more formats or sizes for the set of blind decodes based at least in part on a legacy communication technology. In an aspect, control information decoding component 510, e.g., in conjunction with processor(s) 503, memory 505, and/or transceiver 506, can determine the one or more formats or sizes for the set of blind decodes based at least in part on a legacy communication technology (e.g., as the same as those defined for the legacy communication technology, a subset (e.g., fraction) or multiple of those defined for the legacy communication technology, etc.). In either case, for example, the number of blind decodes in the set of blind decodes for the low latency communication technology can be the same as the number of blind decodes in a set of blind decodes for the legacy communication technology. In an example, an association of formats or sizes to the legacy communication technology may be known or configured in the UE 502 (e.g., based on a hardcoded configuration, a configuration received from the eNB 504 or other network component, etc.).

In addition, at Block 716, the UE can optionally perform one or more of a set of legacy blind decodes over a legacy search space in an attempt to decode at least legacy control information. In an aspect, control information decoding component 510, e.g., in conjunction with processor(s) 503, memory 505, and/or transceiver 506, can perform the one or more of a set of legacy blind decodes over the legacy search space in an attempt to decode at least legacy control information. Thus, the UE 502 can receive and decode low latency and legacy control information in one example (e.g., the UE 502 can be configured to be served using either legacy LTE or ULL LTE, or using legacy LTE and ULL LTE). For example, UE 502 may rely on low latency services for communication (except for fallback operations). In another example, UE 502 can flexibly support low latency and legacy communications, as described herein. If the UE 502 has to search for both legacy control information and low latency control information in the legacy control channel region on a per-subframe basis, the number of blind decodes can be large. In this example, in performing the one or more of the set of blind decodes at Block 710, the UE can optionally, at Block 718, determine the set of blind decodes and/or a number of aggregation levels for the low latency control information, and similarly, in performing the one or more of the set of blind decodes at Block 716, can optionally, at Block 720, determine the set of blind decodes and/or a number of aggregation levels (e.g., for use in performing the set of legacy blind decodes for the legacy control information).

For example, in performing the one or more of the set of blind decodes, control information decoding component 510 can determine the set of blind decodes for the low latency and legacy control information as shared (e.g., based on the same set of sizes for the control information) across the legacy and low latency communication technologies. In one example, ULL determining component 514 can receive the indication from the access point (e.g., as transmitted by ULL indicating component 524) of at least low latency control information included in the search space (e.g., in the DCI format for the control information) so the control information decoding component 510 can attempt to decode one or more of the low latency control information or the legacy control information in the same or respective search spaces.

In another example, the legacy search space for legacy control information can be reduced, and the search space for the low latency control information can be sized to fit within the space left over from the reduction. For example, in performing the one or more of the set of blind decodes, control information decoding component 510 can determine a reduced number of blind decode candidates per each aggregation level for the legacy control information, and may determine a number of blind decode candidates per aggregation level for the low latency control information based on the reduced number of blind decode candidates in the legacy communication technology. For example, ULL indicating component 524 or another component of the eNB 504 can indicate the reduced number of blind decode candidates per each aggregation for the legacy and/or low latency control information. In one example, where ULL indicating component 524 indicates a reduced number of blind decode candidates for the legacy control information, control information decoding component 510 can determine a number of blind decode candidates for the low latency control information based at least in part on a total number of blind decode candidates minus the number of blind decode candidates for the legacy control information. In another example, ULL Indicating component 524 can indicate the reduction in candidates using a 2-bit indicator similar to enhanced carrier aggregation (0, 0.33, 0.66, 1.0) per aggregation level per component carrier. In this example, control information decoding component 510 can determine the 2-bit indicator and the associated reduction in determining the number of blind decodes for the legacy and/or low latency control information.

In another example, in performing the one or more of the set of blind decodes, control information decoding component 510 can determine a reduced number of aggregation levels for performing blind decoding of the legacy control information (e.g., based on an indicator received from the eNB 504), and may determine a number of aggregation levels for the set of blind decodes for the low latency control information based on the reduced number of blind decode candidates in the legacy communication technology. In an example, the aggregation levels used for the set of blind decodes for the legacy control information and the set of blind decodes for the low latency control information can be the same or different. Moreover, for example, the UE 502, e.g., via control information decoding component 510, can receive the number of aggregation levels from the eNB 504, e.g., via control information generating component 520, over RRC signaling. In this example, a UE 502 that can support a large number of layers can potentially be scheduled using smaller aggregation levels (e.g., 1 and 2). In an example, control information decoding component 510 can determine to use the same aggregation levels as legacy (e.g., 1, 2, 4, 8) or different aggregation levels (e.g., 3, 6), which may be based on an indicator from eNB 504.

In another example, in performing the one or more of the set of blind decodes, control information decoding component 510 can determine a reduced number of DCI sizes for the legacy control information (e.g., based on an indicator received from the eNB 504), and may determine a number of DCI sizes for the low latency control information based on the reduced number of DCIs in the legacy communication technology (which may include similar or different sizes than those used in the set of legacy blind decodes).

As described, for example, in performing the one or more of the set of blind decodes, a combination of the above may be used. In any case, the UE 502 can receive a configuration indicating which of the above example(s) can be used in determining the set of blind decodes. Also, in any case, control information processing component 512 can process the decoded control information.

Figure 8:
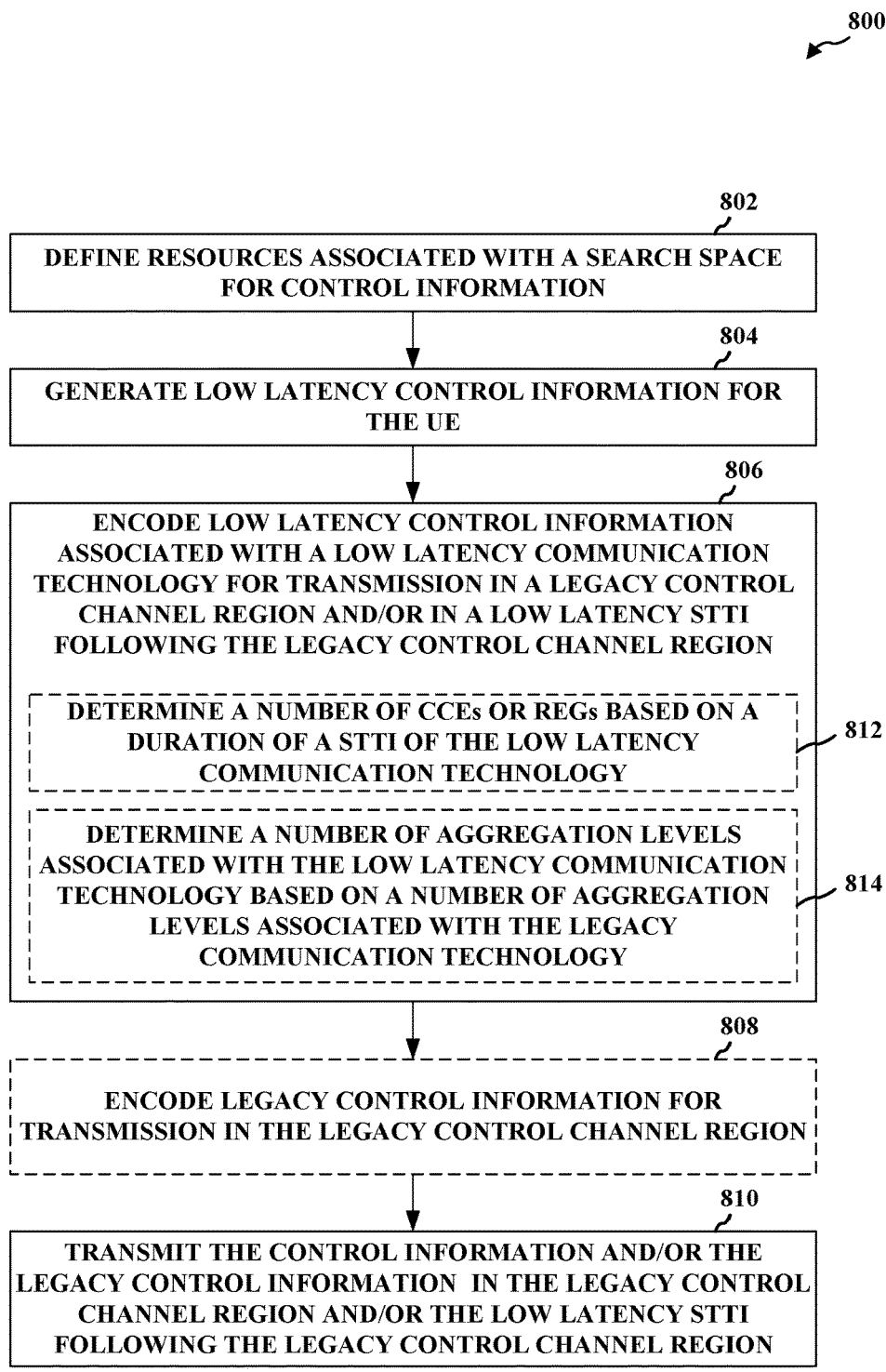
FIG. 8 is a flow chart of an example of a second method for encoding low latency control information in accordance with aspects described herein.

FIG. 8 illustrates an example of a method 800 for transmitting (e.g., by an eNB) control information over one or more search spaces. In method 800, blocks indicated as dashed boxes represent optional steps.

At Block 802, the eNB may define resources associated with a search space for control information. In an aspect, scheduling component 302, e.g., in conjunction with processor(s) 553, memory 555, and/or transceiver 556, can define the resources associated with the search space for the control information. For example, scheduling component 302 can define the resources as a portion of frequency (e.g., a system bandwidth) over a period of time according to a standard for the communication technology (e.g., LTE). In an example, the search space can include a common search space (CSS), a UE-specific search space (DESS), which can be indicated to the UE in one or more communications from the eNB 504 (e.g., as part of a random access procedure performed by the UE 502 and eNB 504), and/or the like. In an example, the eNB 504 can utilize the search space to transmit control information for one or more UEs, and the one or more UEs can search the search space for control information related to the given UE (e.g., based on an assigned RNTI).

In one example, scheduling component 302 may define a first set of resources associated with legacy control information and a second set of resources associated with low latency control information. The first set of resources may be contiguous (e.g., overlapping or adjacent) to the second set of resources in frequency and/or time, in one example, or may be non-contiguous. Moreover, in an example, scheduling component 302 may define a search space for the low latency communication technology within a legacy control channel region (e.g., PDCCH region) of the legacy communication technology. In yet an additional or alternative example, scheduling component 302 may define the search space for the low latency communication technology to include one or more low latency sTTIs following the legacy control channel region (e.g., one or more low latency sTTIs adjacent to the legacy control channel region or otherwise).

At Block 804, the eNB can generate low latency control information for the UE. In an aspect, control information generating component 520, e.g., in conjunction with processor(s) 553, memory 555, and/or transceiver 556, can generate the low latency control information for the UE (e.g., UE 502). For example, the low latency control information may indicate one or more parameters of a stage grant in a multiple stage grant (e.g., a first stage grant, which may include information related to other stages in the multiple stage grant, such as aggregation level, information related to uPDSCH scheduling, such as a modulation and coding scheme (MCS), etc.). Moreover, in an example, contents of the first stage grant may be different at different action times. For example, at a first time t1 (e.g., in a next subframe), the first stage grant can include one or more parameters regarding a next stage in the multiple stage grant. In another example, at a second time t2 (e.g., in a next low latency sTTI), the first stage grant can include information regarding one or more data channels (e.g., uPDSCH). In either case, scheduling component 302 can transmit the associated low latency control information as part of the first stage grant based on whether the time is t1 or t2.

In either case, at Block 806, the eNB can encode the low latency control information associated with a low latency communication technology for transmission in a legacy control channel region and/or a low latency sTTI following the legacy control channel region. In an aspect, control information encoding component 522, e.g., in conjunction with processor(s) 553, memory 555, and/or transceiver 556, can encode the low latency control information associated with the low latency communication technology for transmission in the legacy control channel region (e.g., a PDCCH region) and/or a low latency sTTI following the legacy control channel region. In one example, control information encoding component 522 can encode one or more uplink grants (e.g., for a low latency control channel, such as uPUCCH, a low latency data channel, such as uPUSCH, etc.) and/or stage 0 grants in the PDCCH region. In another example, control information encoding component 522 can encode stage 1 grants and/or grant scheduling uPDSCH in a first low latency sTTI following the legacy control channel region. Thus, in some cases, control information encoding component 522 may encode low latency control information for transmission in each of the legacy control channel region, which can occur in the first portion (e.g., one or more symbols) of the subframe and/or may overlap one or more low latency sTTIs, and the low latency sTTI following this region (e.g., sTTIs in a legacy data channel region).

In an example, control information encoding component 522 may encode the low latency control information in the legacy control channel region to be the same size as or different size from the low latency control information encoded in the first low latency sTTI following the legacy control channel region. In addition, in an example, control information encoding component 522 can encode the low latency control information in the legacy control channel region using the same or different (e.g., higher or lower) number of encoding candidates as used for encoding the low latency control information in the low latency sTTI following the legacy control channel region. In addition, the encoding candidates used in encoding the low latency control information in the legacy control channel region or in the low latency sTTI may be configured to the UE 502 (e.g., via RRC signaling).

As described, the control information encoding component 522 can encode the low latency control information in one or both of the legacy control channel region and/or the low latency sTTI adjacent to the legacy control channel region. For example, the eNB 504 can transmit the low latency control information in both the low latency sTTI adjacent to the legacy control channel region and in the legacy control channel region to increase reliability of the UE 502 receiving the low latency control information. In this example, control information encoding component 522 can encode the same control information in the legacy control channel region and the low latency sTTI, or complementary control information (e.g., stage 0 grant in the legacy control channel region and stage 1 grant in the low latency sTTI). Additionally, the UE 502 receiving the control information can accumulate information from both transmissions (e.g., power control commands).

At Block 808, the eNB can optionally encode legacy control information for transmission in the legacy control channel region. In an aspect, control information encoding component 522, e.g., in conjunction with processor(s) 553, memory 555, and/or transceiver 556, can encode the legacy control information for transmission in the legacy control channel region. For example, in this regard, control information encoding component 522 can multiplex the low latency control information and the legacy control information within the legacy control channel region.

At Block 810, the eNB can transmit the control information and/or the legacy control information in the legacy control channel region and/or the low latency sTTI following the legacy control channel region. In an aspect, scheduling component 302, e.g., in conjunction with processor(s) 553, memory 555, and/or transceiver 556, can transmit the control information and/or the legacy control information in the legacy control channel and/or the low latency sTTI following the legacy control region. In an example, where scheduling component 302 transmits the low latency control information over the legacy control channel region, it can use a similar structure.

For example, in encoding the low latency control information at Block 806, the UE can optionally, at Block 812, determine a number of CCEs or REGs based on a duration of a sTTI of the low latency communication technology. In an aspect, control information encoding component 522, e.g., in conjunction with processor(s) 553, memory 555, and/or transceiver 556, can determine the number of CCEs or REGs based on the duration of the sTTI of the low latency communication technology (e.g., based on a mapping or other function of number of CCEs or REGs to sTTI durations, which may be received in a configuration from the eNB 504 or other network component). In another example, control information encoding component 522 can determine the number of CCEs or REGs based on a number of CCEs or REGs used in encoding the legacy control information at Block 808 (e.g., to be the same as or different from the number of CCEs or REGs used in encoding the legacy control information), which may ease multiplexing of the low latency control information with the legacy control information.

In another example, in encoding the low latency control information at Block 806, the UE can optionally, at Block 814, determine a number of aggregation levels associated with the low latency communication technology based on a number of aggregation levels associated with the legacy communication technology. In an aspect, control information encoding component 522, e.g., in conjunction with processor(s) 553, memory 555, and/or transceiver 556, can determine the number of aggregation levels associated with the low latency communication technology based on the number of aggregation levels associated with the legacy communication technology. In another example, control information encoding component 522 can determine the number of aggregation levels associated with the low latency communication technology to be different than the number of aggregation levels associated with the legacy communication technology. Additional aggregation levels can be used as well (e.g., levels 3 and 6 instead of or in addition to levels 1, 2, 4, 8). The eNB 504 can indicate the aggregation levels to the UE 502 via higher layer signaling, as described. Using different aggregation levels for the low latency control information and legacy control information can allow for more flexible multiplexing among CCEs of the low latency control information and legacy control information in the legacy control channel region. In either case, as in LTE, the number of CCEs utilized can be a function of a number of symbols used for control information, a number of resource elements used for common reference signals, and/or a number of resource elements used for physical HARQ indicator channel (PHICH) and physical control format indicator channel (PCFICH).

Figure 9:
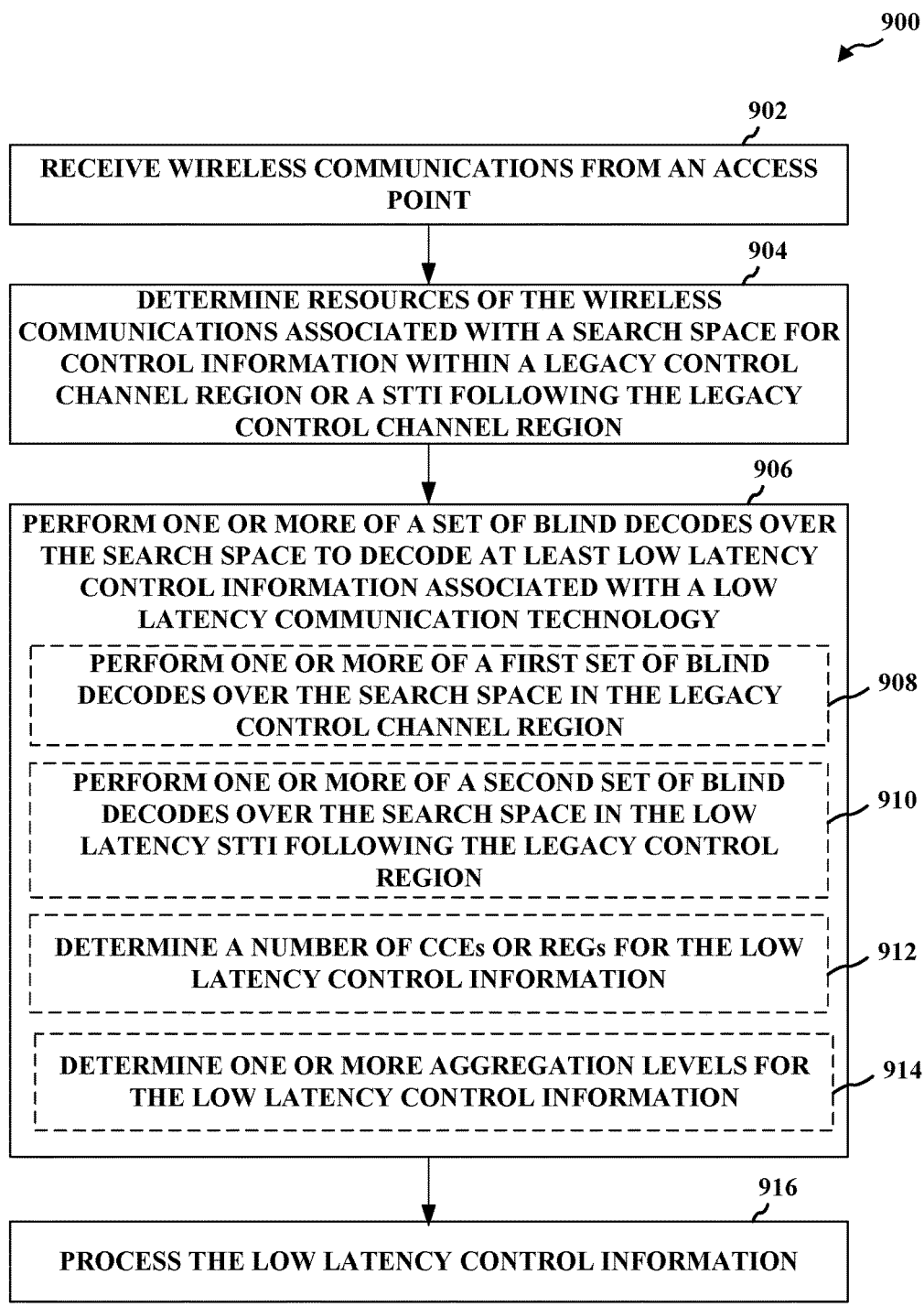
FIG. 9 is a flow chart of an example of a second method for decoding low latency control information in accordance with aspects described herein.

FIG. 9 illustrates an example of a method 900 for receiving (e.g., by a UE) control information over one or more search spaces. In method 900, blocks indicated as dashed boxes represent optional steps.

At Block 902, the UE can receive wireless communications from an access point. In an aspect, communicating component 361, e.g., in conjunction with processor(s) 503, memory 505, and/or transceiver 506, can receive the wireless communications from the access point. For example, the UE can receive the communications in a search space (e.g., a CSS, UESS, etc.), which can include a search space defined in a legacy control channel region, as described.

At Block 904, the UE can determine resources of the wireless communications associated with a search space for control information within a legacy control channel region or a sTTI following the legacy control channel region. In an aspect, control information decoding component 510, e.g., in conjunction with processor(s) 503, memory 505, and/or transceiver 506, can determine resources of the wireless communications associated with the search space for control information within the legacy control channel region or the sTTI following the legacy control channel region. In one example, control information decoding component 510 can monitor the legacy control channel region and/or the low latency sTTI for the low latency control information. For example, the control information decoding component 510 can determine the search space as including at least a portion of a legacy control channel region and/or one or more low latency sTTIs following (e.g., adjacent to) the legacy control channel region. Accordingly, the UE may monitor both the legacy control channel region and/or the one or more low latency sTTIs for low latency control information. This can allow the UE 502 to decode the control information where the legacy control channel region may include other data for the UE 502. In another example, the UE 502 can monitor only the legacy control channel region for the low latency control information.

At Block 906, the UE can perform one or more of a set of blind decodes over the search space to decode at least low latency control information associated with a low latency communication technology. In an aspect, control information decoding component 510, e.g., in conjunction with processor(s) 503, memory 505, and/or transceiver 506, can perform the one or more of the set of blind decodes over the search space to decode at least low latency control information associated with the low latency communication technology. For example, in performing the one or more of the set of blind decodes, the UE may optionally, at Block 908, perform one or more of a first set of blind decodes over the search space in the legacy control channel region, and/or at Block 910, perform one or more of a second set of blind decodes over the search space in the low latency sTTI following the legacy control region. In an aspect, control information decoding component 510 can perform the one or more of the first set of blind decodes over the search space in the legacy control channel region, and perform the one or more of the second set of blind decodes over the search space in the low latency sTTI following the legacy control region. For example, the first set of blind decodes may be different or the same as the second set of blind decodes, as described. In another example, control information decoding component 510 can determine the number of the first set of blind decodes based on a number of the second set of blind decodes (e.g., the number of the second set of blind decodes subtracted from the 44 blind decodes, without UL MIMO, in LTE), as described. In any case, for example, control information decoding component 510 can receive the number of the first set of blind decodes and/or the number of the second set of blind decodes from the eNB 504 in higher layer signaling.

Moreover, in performing the one or more of the set of blind decodes, for example, the UE may optionally, at Block 912, determine a number of CCEs or REGs for the low latency control information. In an aspect, control information decoding component 510, e.g., in conjunction with processor(s) 503, memory 505, and/or transceiver 506, can determine the number of CCEs or REGs for the low latency control information in performing blind decoding of the control information. For example, as described, control information decoding component can determine the number of CCEs or REGs based on the number of CCEs or REGs used to decode legacy control information, based on a sTTI duration of the low latency communication technology, etc. For example, due to granularity of resource allocation, a one slot control payload can be larger than that of a two symbol control information.

Moreover, in performing the one or more of the set of blind decodes, for example, the UE may optionally, at Block 914, determine one or more aggregation levels for the low latency control information. In an aspect, control information decoding component 510, e.g., in conjunction with processor(s) 503, memory 505, and/or transceiver 506, can determine the one or more aggregation levels for the low latency control information. As described, control information decoding component 510 can determine the one or more aggregation levels to be the same as one or more aggregation levels used in performing blind decoding of the legacy control information. In another example, control information decoding component 510 can determine the one or more aggregation levels based on a sTTI duration of the low latency communication technology, as described. In yet another example, control information decoding component 510 can determine the one or more aggregation levels based on higher layer signaling received from the eNB 504.

At Block 916, the UE can process the low latency control information. In an aspect, control information processing component 512, e.g., in conjunction with processor(s) 503, memory 505, and/or transceiver 506, can process the low latency control information. For example, the low latency control information may indicate a first stage grant (e.g., stage 0 grant) of a multiple stage grant, which may include information related to a next stage grant (e.g., stage 1 grant), such as aggregation level, information related to uPDSCH scheduling, such as MCS, etc. As described, for example, the stage 0 grants may include different information at different action times (e.g., information related to a next stage grant when received in a next subframe, information related to sPDSCH when received in a next low latency TTI, etc.). For example, the decoding of PDSCH can rely on stage 0 and/or stage 1 grants, where the two grants can be decoded in parallel, while the decoding of stage 1 grant may rely on stage 0 grant. Thus, a sequential decoding of the two grants may result in potential PDSCH decoding delay. In another example, eNB 504 can transmit the different information at the same action times (e.g., in the same or nearby search spaces). In another example, control information processing component 512 can process low latency control information in the legacy control channel region to include an uplink grant for a low latency TTI and/or a stage 0 grant. In this or another example, control information processing component 512 can process low latency control information in the low latency TTI to include a next stage grant, a complete grant scheduling sPDSCH or sPUSCH in the low latency sTTI, etc.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for decoding control information in wireless communication, comprising:
   receiving wireless communications from an access point;
   determining resources of the wireless communications associated with a search space for control information in the received wireless communications;
   determining, based on one of multiple possible transmission time interval (TTI) durations configured for a low latency communication technology, one or more control channel element (CCE) sizes defined for the control information; and
   performing, based on the one or more CCE sizes, one or more of a set of blind decodes over the search space to decode at least low latency control information associated with the low latency communication technology, wherein the low latency communication technology uses the one of the multiple possible TTI durations, which is less than a subframe of a legacy communication technology.

2. The method of claim 1, further comprising receiving an indicator from the access point that the search space includes the low latency control information associated with the low latency communication technology.

3. The method of claim 1, wherein performing the one or more of the set of blind decodes is based at least in part on one or more formats or sizes defined for the low latency control information.

4. The method of claim 1, wherein performing the one or more of the set of blind decodes is based at least in part on one or more formats or sizes defined for control information of the legacy communication technology.

5. The method of claim 1, wherein a number of the set of blind decodes is the same as or less than a legacy number of a set of blind decodes defined for the legacy communication technology.

6. The method of claim 1, further comprising performing one or more of a set of legacy blind decodes over a legacy search space in an attempt to decode at least legacy control information associated with the legacy communication technology.

7. The method of claim 6, wherein the set of blind decodes and the set of legacy blind decodes are based on a similar set of possible sizes for the low latency control information and the legacy control information.

8. The method of claim 6, wherein at least one of the low latency control information or the legacy control information includes an indicator indicating an associated communication technology.

9. The method of claim 6, further comprising:
   receiving an indicator to reduce a number of blind decoding candidates; and
   determining the set of blind decodes and the set of legacy blind decodes based at least in part on the indicator, wherein a number of the set of blind decodes and the set of legacy blind decodes as reduced are equal to a number of the set of legacy blind decodes before reducing.

10. The method of claim 6, further comprising:
    receiving an indicator to reduce a number of aggregation levels for performing blind decoding; and
    determining the set of blind decodes and the set of legacy blind decodes based at least in part on the indicator.

11. The method of claim 10, wherein the indicator specifies a first number of aggregation levels for the low latency communication technology and a second number of aggregation levels for the legacy communication technology.

12. The method of claim 6, further comprising:
    determining the set of legacy blind decodes based on reducing a number of possible sizes for the legacy control information; and
    determining the set of blind decodes based on determining a difference between a first number of the set of legacy blind decodes prior to reducing the number of possible sizes and a second number of the set of legacy blind decodes after reducing the number of possible sizes.

13. The method of claim 6, wherein the search space and the legacy search space are in contiguous resources of the wireless communications.

14. The method of claim 6, wherein the search space and the legacy search space are in non-contiguous resources of the wireless communications, and further comprising:
    locating the search space within the wireless communications based on a first assigned radio network temporary identifier; and
    locating the legacy search space within the wireless communications based on a second assigned radio network temporary identifier.

15. The method of claim 1, wherein the low latency control information includes a first stage grant of a multiple stage grant.

16. The method of claim 15, wherein the first stage grant indicates at least one of information related to one or more additional stage grants in the multiple stage grant or resources scheduled for one or more data channels.

17. The method of claim 15, wherein the first stage grant indicates information related to one or more additional stage grants in the multiple stage grant at a first action time, and a subsequent first stage grant indicates resources scheduled for one or more data channels at a second action time.

18. The method of claim 1, wherein the search space corresponds to a legacy control channel region for the legacy communication technology.

19. The method of claim 18, wherein the low latency control information includes at least one of one or more uplink grants for the low latency communication technology or a first stage grant of a multiple stage grant.

20. The method of claim 18, wherein the low latency control information includes at least one of one or more grants of a multiple stage grant or a grant scheduling a low latency data channel in a first TTI of the low latency communication technology following the legacy control channel region.

21. The method of claim 18, wherein the low latency control information includes a grant scheduling a low latency control channel in a first TTI of the low latency communication technology following the legacy control channel region.

22. The method of claim 21, further comprising performing one or more of a plurality of low latency blind decodes over a low latency search space defined in the first TTI of the low latency communication technology following the legacy control channel region in an attempt to decode at least a second low latency control information associated with the low latency communication technology.

23. The method of claim 22, wherein a first size of the low latency control information in the legacy control channel region is the same as a second size of the second low latency control information.

24. The method of claim 22, wherein a first number of the set of blind decodes is greater than a second number of the plurality of low latency blind decodes.

25. The method of claim 18, further comprising performing one or more of a set of legacy blind decodes over the search space in an attempt to decode at least legacy control information associated with the legacy communication technology.

26. The method of claim 25, further comprising determining a first number of the set of legacy blind decodes based at least in part on a second number of the set of blind decodes.

27. The method of claim 1, wherein a number of control channel elements or resource element groups defining the low latency control information are different than for legacy control information.

28. The method of claim 27, wherein the number of control channel elements or resource element groups is based on the TTI duration.

29. The method of claim 1, wherein a number of control channel elements or resource element groups defining the low latency control information are the same as for legacy control information of the legacy communication technology.

30. The method of claim 1, wherein a first number of aggregation levels associated with the low latency control information is the same as a second number of aggregation levels associated with legacy control information of the legacy communication technology.

31. The method of claim 1, wherein a first number of aggregation levels associated with the low latency control information includes one or more aggregation levels not supported by the legacy communication technology.

32. An apparatus for decoding control information in wireless communication, comprising:
a transceiver for communicating one or more wireless signals via one or more antennas, the transceiver configured to receive wireless communications from an access point;
a memory configured to store instructions; and
one or more processors communicatively coupled with the transceiver and the memory, wherein the one or more processors are configured to:
determine resources of the wireless communications associated with a search space for control information in the received wireless communications;
determine, based on one of multiple possible transmission time interval (TTI) durations configured for a low latency communication technology, one or more control channel element (CCE) sizes defined for the control information; and
perform, based on the one or more CCE sizes, one or more of a set of blind decodes over the search space to decode at least low latency control information associated with the low latency communication technology, wherein the low latency communication technology utilizes the one of the multiple possible TTI durations, which is less than a subframe of a legacy communication technology.

33. The apparatus of claim 32, wherein the transceiver is further configured to receive an indicator which indicates that the search space includes the low latency control information associated with the low latency communication technology.

34. The apparatus of claim 32, wherein the one or more processors are configured to perform the one or more of the set of blind decodes based at least in part on one or more formats defined for the low latency control information.

35. The apparatus of claim 32, wherein the one or more processors are configured to perform the one or more of the set of blind decodes based at least in part on one or more formats or sizes defined for control information of the legacy communication technology.

36. The apparatus of claim 32, wherein a number of the set of blind decodes is the same as or less than a legacy number of a set of blind decodes defined for the legacy communication technology.

37. The apparatus of claim 32, wherein the one or more processors are further configured to perform one or more of a set of legacy blind decodes over a legacy search space in an attempt to decode at least legacy control information associated with the legacy communication technology.

38. The apparatus of claim 37, wherein the set of blind decodes and the set of legacy blind decodes are based on a similar set of possible sizes for the low latency control information and the legacy control information.

39. The apparatus of claim 37, wherein at least one of the low latency control information or the legacy control information includes an indicator indicating an associated communication technology.

40. The apparatus of claim 37, wherein the transceiver is further configured to receive an indicator to reduce a number of blind decoding candidates; and
wherein the one or more processors are further configured to determine the set of blind decodes and the set of legacy blind decodes based at least in part on the indicator, wherein a number of the set of blind decodes and the set of legacy blind decodes as reduced are equal to a number of the set of legacy blind decodes before reducing.

41. The apparatus of claim 37, wherein the transceiver is further configured receive an indicator to reduce a number of aggregation levels for performing blind decoding; and
wherein the one or more processors are further configured to determine the set of blind decodes and the set of legacy blind decodes based at least in part on the indicator.

42. The apparatus of claim 41, wherein the indicator specifies a first number of aggregation levels for the low latency communication technology and a second number of aggregation levels for the legacy communication technology.

43. The apparatus of claim 37, wherein the one or more processors are further configured to:
determine the set of legacy blind decodes based on reducing a number of possible sizes for the legacy control information; and
determine the set of blind decodes based on determining a difference between a first number of the set of legacy blind decodes prior to reducing the number of possible sizes and a second number of the set of legacy blind decodes after reducing the number of possible sizes.

44. The apparatus of claim 37, wherein the search space and the legacy search space are in contiguous resources of the wireless communications.

45. The apparatus of claim 37, wherein the search space and the legacy search space are in non-contiguous resources of the wireless communications, and wherein the one or more processors are further configured to:
locate the search space within the wireless communications based on a first assigned radio network temporary identifier; and
locate the legacy search space within the wireless communications based on a second assigned radio network temporary identifier.

46. The apparatus of claim 32, wherein the low latency control information includes a first stage grant of a multiple stage grant.

47. The apparatus of claim 46, wherein the first stage grant indicates at least one of information related to one or more additional stage grants in the multiple stage grant or resources scheduled for one or more data channels.

48. The apparatus of claim 46, wherein the first stage grant indicates information related to one or more additional stage grants in the multiple stage grant at a first action time, and a subsequent first stage grant indicates resources scheduled for one or more data channels at a second action time.

49. The apparatus of claim 32, wherein the search space corresponds to a legacy control channel region for the legacy communication technology.

50. The apparatus of claim 49, wherein the low latency control information includes at least one of one or more uplink grants for the low latency communication technology or a first stage grant of a multiple stage grant.

51. The apparatus of claim 49, wherein the low latency control information includes at least one of one or more grants of a multiple stage grant or a grant scheduling a low latency data channel in a first TTI of the low latency communication technology following the legacy control channel region.

52. The apparatus of claim 49, wherein the low latency control information includes a grant scheduling a low latency control channel in a first TTI of the low latency communication technology following the legacy control channel region.

53. The apparatus of claim 52, wherein the one or more processors are further configured to perform one or more of a plurality of low latency blind decodes over a low latency search space defined in the first TTI of the low latency communication technology following the legacy control channel region in an attempt to decode at least a second low latency control information associated with the low latency communication technology.

54. The apparatus of claim 53, wherein a first size of the low latency control information in the legacy control channel region is the same as a second size of the second low latency control information.

55. The apparatus of claim 53, wherein a first number of the set of blind decodes is greater than a second number of the plurality of low latency blind decodes.

56. The apparatus of claim 49, wherein the one or more processors are further configured to perform one or more of a set of legacy blind decodes over the search space in an attempt to decode at least legacy control information associated with the legacy communication technology.

57. The apparatus of claim 56, wherein the one or more processors are further configured to determine a first number of the set of legacy blind decodes based at least in part on a second number of the set of blind decodes.

58. The apparatus of claim 32, wherein a number of control channel elements or resource element groups defining the low latency control information are different than for legacy control information.

59. The apparatus of claim 58, wherein the number of control channel elements or resource element groups is based on the duration of the TTI.

60. The apparatus of claim 32, wherein a number of control channel elements or resource element groups defining the low latency control information are the same as for legacy control information of the legacy communication technology.

61. The apparatus of claim 32, wherein a first number of aggregation levels associated with the low latency control information is the same as a second number of aggregation levels associated with legacy control information of the legacy communication technology.

62. The apparatus of claim 32, wherein a first number of aggregation levels associated with the low latency control information includes one or more aggregation levels not supported by the legacy communication technology.

63. An apparatus for decoding control information in wireless communication, comprising:
a transceiver configured to receive wireless communications from an access point;
means for determining resources of the wireless communications associated with a search space for control information in the received wireless communications;
means for determining, based on one of multiple possible transmission time interval (TTI) durations configured for a low latency communication technology, one or more control channel element (CCE) sizes defined for the control information; and
means for performing, based on the one or more CCE sizes, one or more of a set of blind decodes over the search space to decode at least low latency control information associated with the low latency communication technology, wherein the low latency communication technology utilizes the one of the multiple possible TTI durations, which is less than a subframe of a legacy communication technology.

64. The apparatus of claim 63, wherein the wireless communications include an indicator which indicates that the search space includes the low latency control information associated with the low latency communication technology.

65. The apparatus of claim 63, wherein the means for performing the one or more of the set of blind decodes is based at least in part on one or more formats defined for the low latency control information.

66. The apparatus of claim 63, wherein the means for performing the one or more of the set of blind decodes is based at least in part on one or more formats or sizes defined for control information of the legacy communication technology.

67. The apparatus of claim 63, further comprising means for performing one or more of a set of legacy blind decodes over a legacy search space in an attempt to decode at least legacy control information associated with the legacy communication technology.

68. The apparatus of claim 67, wherein the set of blind decodes and the set of legacy blind decodes are based on a similar set of possible sizes for the low latency control information and the legacy control information.

69. The apparatus of claim 67, wherein the wireless communications include an indicator to reduce a number of blind decoding candidates; and
wherein the means for determining are further configured to determine the set of blind decodes and the set of legacy blind decodes based at least in part on the indicator, wherein a number of the set of blind decodes and the set of legacy blind decodes as reduced are equal to a number of the set of legacy blind decodes before reducing.

70. The apparatus of claim 67, wherein the wireless communications include an indicator to reduce a number of aggregation levels for performing blind decoding; and
wherein the means for determining are further configured to determine the set of blind decodes and the set of legacy blind decodes based at least in part on the indicator.

71. The apparatus of claim 67, wherein the search space and the legacy search space are in contiguous resources of the wireless communications.

72. The apparatus of claim 63, wherein the search space corresponds to a legacy control channel region for the legacy communication technology.

73. The apparatus of claim 72, further comprising means for performing one or more of a set of legacy blind decodes over the search space in an attempt to decode at least legacy control information associated with the legacy communication technology.

74. The apparatus of claim 63, wherein a number of control channel elements or resource element groups defining the low latency control information are different than for legacy control information.

75. A non-transitory computer-readable medium comprising computer-executable code for decoding control information in wireless communication, the code comprising:
code for receiving wireless communications from an access point;
code for determining resources of the wireless communications associated with a search space for control information in the received wireless communications;
code for determining, based on one of multiple possible transmission time interval (TTI) durations configured for a low latency communication technology, one or more control channel element (CCE) sizes defined for the control information; and
code for performing, based on the one or more CCE sizes, one or more of a set of blind decodes over the search space to decode at least low latency control information associated with the low latency communication technology, wherein the low latency communication technology utilizes the one of the multiple possible TTI durations, which is less than a subframe of a legacy communication technology.

76. A method for communicating control information in wireless communications, comprising:
defining resources associated with a search space for control information transmitted in the wireless communications;
determining, based on one of multiple possible transmission time interval (TTI) durations configured for a low latency communication technology, one or more control channel element (CCE) sizes for the control information;
encoding, based on the one or more CCE sizes, low latency control information associated with the low latency communication technology for transmission in a legacy control channel region in the search space, wherein the low latency communication technology uses the one of the multiple possible TTI durations, which is less than a subframe of a legacy communication technology; and
transmitting the low latency control information in the legacy control channel region.

77. An apparatus for communicating control information in wireless communications, comprising:
a transceiver for communicating one or more wireless signals via one or more antennas;
a memory configured to store instructions; and
one or more processors communicatively coupled with the transceiver and the memory, wherein the one or more processors are configured to:
define resources associated with a search space for control information transmitted in the wireless communications;
determine, based on one of multiple possible transmission time interval (TTI) durations configured for a low latency communication technology, one or more control channel element (CCE) sizes for the control information;
encode, based on the one or more CCE sizes, low latency control information associated with the low latency communication technology for transmission in a legacy control channel region in the search space, wherein the low latency communication technology uses the one of the multiple possible TTI durations, which is less than a subframe of a legacy communication technology; and
transmit the low latency control information in the legacy control channel region.

78. An apparatus for communicating control information in wireless communications, comprising:
means for defining resources associated with a search space for control information transmitted in the wireless communications;
means for determining, based on one of multiple possible transmission time interval (TTI) durations configured for a low latency communication technology, one or more control channel element (CCE) sizes for the control information;

means for encoding, based on the one or more CCE sizes, low latency control information associated with the low latency communication technology for transmission in a legacy control channel region in the search space, wherein the low latency communication technology uses the one of the multiple possible TTI durations, which is less than a subframe of a legacy communication technology; and means for transmitting the low latency control information in the legacy control channel region.

79. A non-transitory computer-readable medium comprising computer-executable code for communicating control information in wireless communications, the code comprising:

code for defining resources associated with a search space for control information transmitted in the wireless communications;

code for determining, based on one of multiple possible transmission time interval (TTI) durations configured for a low latency communication technology, one or more control channel element (CCE) sizes for the control information;

code for encoding, based on the one or more CCE sizes, low latency control information associated with the low latency communication technology for transmission in a legacy control channel region in the search space, wherein the low latency communication technology uses the one of the multiple possible TTI durations, which is less than a subframe of a legacy communication technology; and code for transmitting the low latency control information in the legacy control channel region.

* * * * *